(12) United States Patent
Yoshimoto et al.

(10) Patent No.: US 8,291,256 B2
(45) Date of Patent: Oct. 16, 2012

(54) CLOCK STOP AND RESTART CONTROL TO PIPELINED ARITHMETIC PROCESSING UNITS PROCESSING PLURALITY OF MACROBLOCK DATA IN IMAGE FRAME PER FRAME PROCESSING PERIOD

(75) Inventors: Masahiko Yoshimoto, Hyogo (JP); Kentaro Kawakami, Hyogo (JP); Jun Takemura, Hyogo (JP)

(73) Assignee: National University Corporation Kobe University, Hyogo (JP)

( * ) Notice: Subject to any disclaimer, the term of this patent is extended or adjusted under 35 U.S.C. 154(b) by 845 days.

(21) Appl. No.: 12/278,015

(22) PCT Filed: Feb. 5, 2007

(86) PCT No.: PCT/JP2007/051927
§ 371 (c)(1),
(2), (4) Date: Aug. 1, 2008

(87) PCT Pub. No.: WO2007/089014
PCT Pub. Date: Aug. 9, 2007

(65) Prior Publication Data
US 2009/0024866 A1    Jan. 22, 2009

(30) Foreign Application Priority Data
Feb. 3, 2006  (JP) .................................. 2006-027431

(51) Int. Cl.
*G06F 1/04*  (2006.01)
*G06F 15/80* (2006.01)
(52) U.S. Cl. .......................................... 713/600; 712/30
(58) Field of Classification Search ........................ None
See application file for complete search history.

(56) References Cited

U.S. PATENT DOCUMENTS
5,734,913 A    3/1998   Iwamura et al.
(Continued)

FOREIGN PATENT DOCUMENTS
JP            4-143819 A    5/1992
(Continued)

OTHER PUBLICATIONS
International Search Report, PCT/JP2007/051927, Sep. 8, 2007, pp. 4.
(Continued)

*Primary Examiner* — Kenneth Kim
(74) *Attorney, Agent, or Firm* — Ogilvie Law Firm

(57) ABSTRACT

A digital VLSI circuit is provided with functions in which the number of switching operations to supply electric power to each arithmetic operation unit is reduced in a restricted period of time while electric power supply is controlled for each arithmetic operation unit, so that low power consumption can be achieved in real pipe-line arithmetic operation. The VLSI circuit that performs each stage of the pipe-line arithmetic operation is comprised of a plurality of arithmetic operation units for carrying out arithmetic operations in synchronization with a clock signal, a detecting means for detecting completion of the stage in the arithmetic operation assigned to the arithmetic operation unit, and a clock signal supply control means for controlling supply/stop operation of the clock signal to each arithmetic operation unit, wherein the clock signal supply control means stops supplying the clock signal to a certain arithmetic operation unit when the detecting means detects the completion of the arithmetic operation assigned to the same, and restarts supplying the clock signal to all the arithmetic operation units for a next pipe-line arithmetic operation when the detecting means detects the completion of the arithmetic operations assigned to them.

8 Claims, 29 Drawing Sheets

U.S. PATENT DOCUMENTS

| | | | |
|---|---|---|---|
| 6,173,408 B1 * | 1/2001 | Jimbo et al. | 713/322 |
| 7,043,658 B2 * | 5/2006 | Chen et al. | 713/600 |
| 7,694,042 B2 * | 4/2010 | Lee et al. | 710/52 |
| 7,773,236 B2 * | 8/2010 | Yamada | 358/1.1 |
| 2003/0037226 A1 | 2/2003 | Tsuruta et al. | |
| 2005/0273639 A1 | 12/2005 | Pessolano | |

FOREIGN PATENT DOCUMENTS

| | | |
|---|---|---|
| JP | 2002-268877 A | 9/2002 |
| JP | 2003-263311 A | 9/2003 |
| WO | 01/33351 A | 5/2001 |

OTHER PUBLICATIONS

English Translation of the Written Opinion of the International Search Authority, PCT/JP2007/051927, Oct. 12, 2008, pp. 3.

* cited by examiner

US 8,291,256 B2

CLOCK STOP AND RESTART CONTROL TO PIPELINED ARITHMETIC PROCESSING UNITS PROCESSING PLURALITY OF MACROBLOCK DATA IN IMAGE FRAME PER FRAME PROCESSING PERIOD

RELATED APPLICATIONS

The present application claims priority to, and incorporates the content of, PCT application number PCT/JP2007/51927 filed on 5 Feb. 2007, which claims priority to and incorporates Japanese patent application number JP 2006-027431 filed on 3 Feb. 2006.

BACKGROUND OF THE INVENTION

The present invention relates to a digital VLSI circuit with low power consumption, especially digital VLSI circuit with contemplated power saving by controlling clock signal supply and power supply by a plurality of inner arithmetic operation units executing pipeline arithmetic processing and relates to digital VLSI circuit with contemplated power saving by feedback control or feedforward control of operating power voltage, board bias voltage and operating frequency. Moreover the invention relates to image processing system and mobile terminal into which the digital VLSI circuit with low power consumption is incorporated.

BACKGROUND ART

In recent years it is widely used to send and receive dynamic picture images through communication network and to store it in storage media. Generally, volume of dynamic picture images is large, the encoding/decoding technology is requisite when dynamic picture images transmit on channel with limited transmitted bit rate, or when dynamic picture images is stored in storage media with limited capacity. Encoding/decoding system is MPEG (Moving Picture Experts Group) and H.26X that ISO/IEC promote to standardize. These are encoding or decoding a plurality of temporally-continuous frames comprise dynamic picture images, and are technologies which encode information volume of dynamic picture images reduced by eliminating redundancy used temporal and special correlation and which decode encoded dynamic picture to the original dynamic picture images again.

The technology of encoding/decoding is applied to mobile phones and other information terminals incorporating personal computer or microcomputer etc.

FIG. 20 is a block diagram of H.264 decode processing module. The method to construct H.264 decode processing module is to construct by dedicatedized hardware, and to construct by operating general-purpose processor on the program describing means of encoding/decoding.

FIG. 21 is an example to construct H.264 decode processing module by dedicatedized hardware using a plurality of arithmetic units.

After the bit stream as information on difference image is accepted by bit stream buffer 1001, the difference image is generated, operated in the order of the entropy decode 1002 (variable length decoding process), inverse quantization process 1003 (inverse Q process), inverse orthogonal conversion process 1004 (inverse T process). Meanwhile expected image generation process 1005 is executed concurrently with difference image generation process on image being extracted in the current frame memory. The frame image is generated by adding process 1006 of the difference image and predicted image.

These arithmetic processing link sequentially, and these a plurality of arithmetic processing can be divided into pipeline arithmetic processing. When arithmetic processing illustrated FIG. 21 is pipeline process at macroblock level, pipeline division as shown in FIG. 22 is possible. In the case of FIG. 22 it is divided into seven stages.

It is important to consider that pipeline doesn't break in hardware design of pipeline arithmetic processing.

It is general in pipe-line division to design cycle number in the case it takes the most time at pipe-line operation of each stage as the worst cycle number Sn (n is counting number), and to ensure the worst cycle number Sn as processing time of each pipe-line, keeping pipe-line processing from breaking.

The design of pipe-line division is preferable to make the worst cycle number equal as much as possible as to improve performance of overall pipe-line in quality.

It is preferred to design, as the following formula (formula 1) is true.

$$Si=Sj \text{ for any } i, j \quad \text{(formula 1)}$$

The ideal decode processing of dynamic picture image is to fulfill the above (formula 1), to exercise the upper-bound performance of all arithmetic unit and to continue to process at constant cycle number. If such constant cycle number is designed as the worst cycle number, arithmetic unit does not idle away and pipeline processing is executed to upper limit of processing ability of arithmetic unit.

But in actual pipeline processing, there is no such ideal status and cycle number of actual pipeline processing is always lower than worst cycle number.

First, on the frame which intensity of change (intensity of movement) between dynamic image pictures is small, processing cycle number becomes smaller than the worst cycle number. Because about encoding/decoding process of dynamic picture image, as arithmetic throughput becomes high according to intensity of change (intensity of movement) between dynamic image pictures, in the case of frame in which intensity of change (intensity of movement) is not big, processing cycle number becomes small. On even frame which intensity of change (intensity of movement) between dynamic image pictures is big, processing cycle number becomes smaller than the worst cycle number for the following reason.

(Reason 1) Nonzero number of effectiveness factor which needs inverse Q process of factors (384) included in 1 macroblock is smaller than 384.

(Reason 2) Number of effectiveness block including effectiveness factor more than one which needs inverse T process among blocks (24) included in 1 macroblock is smaller than 24.

(Reason 3) Blocks which need Intra predicted process among blocks included in 1 macroblock is smaller than 24. Moreover, even if blocks need Intra predicted process, necessary process cycle is changed by predicted mode (when it may be only copy of pixel value and when it must be calculated from plurality of pixel).

(Reason 4) Number of effective block which needs addition of predicted and difference image among blocks included in 1 macroblock is smaller than 24.

(Reason 5) Number of blocks which needs deblocking filter processing among blocks included in 1 macroblock is smaller than 24.

(Reason 6) Number of block which needs to write on frame memory (FM) among blocks included in 1 macroblock is smaller than 24. As the above described reason, number of processing cycle is smaller than the worst cycle number even if it is the frame which intensity of change (intensity of movement) between dynamic image pictures is big.

In FIG. 23, pipeline comprising 3 arithmetic processing stage are shown. In the case of pipeline comprising more than 3 arithmetic processing stage, number of arithmetic unit increases according to arithmetic stage. In the case of digital VLSI circuit processing dynamic picture image data by macroblock pipeline, data n of FIG. 23 is replaced by macroblock n and in the case of digital VLSI circuit processing by block pipeline, replaced by block n.

As shown in FIG. 23, it is understood that non-hatched period (period of idle status in which arithmetic unit is not in operation) appears.

As described above, in arithmetic processing of pipeline, as design has redundancy (allowance) than actual arithmetic processing, redundant cycle appears in which arithmetic unit is not in operating.

As innovation reducing power consumption of whole digital VLSI circuit using this redundancy (allowance) in arithmetic processing of the pipeline, there is clock gating. (Japanese Unexamined Patent Application Publication No. 1998-020959)

Clock gating is a technique reducing power consumption without supplying clock to arithmetic unit unrequisite for operating in executing pipeline processing. In arithmetic unit operating in sync with clock, as current consumption is large, by constituting to supply clock only to arithmetic unit, which executes arithmetic processing, power consumption of whole digital VLSI circuit can be reduced. As shown in FIG. 23, non-hatched period in pipeline processing is a period of idle status in which arithmetic unit is not in operating. In the period, stopping clock signal supply for arithmetic unit reduces power consumption of whole digital VLSI circuit.

In addition, from the viewpoint of controlling power supply of redundant cycle without arithmetic processing, replacing control of clock signal supply, ON/OFF control of power supply (current supply) is similar (Japanese Unexamined Patent Application Publication No. 2005-235203).

FIG. 24 is an example of flowchart in the case that H.264 decoding process module is constituted by operating with general-purpose processor (hereinafter called software processing) based on program describing decoding means according to block diagram shown in FIG. 20. In FIG. 24, 1 frame processing is described. For each macroblock comprising frame, entropy decoding, inverse Q, inverse T, intra prediction/inter prediction, addition of predicted image and difference image, deblocking filter processing and writing in frame memory are executed sequentially and these processes are repeated by number of macroblock comprising frame.

FIG. 26 is a diagram showing situation of cycle number, which is necessary for software processing.

Encoding/decoding process of dynamic picture image is constrained by frame processing time Tf according to such as rule of encoding system (MPEG, H.26x and like that). Therefore, on encoding/decoding process by software process, programs are built as cycle number necessary for arithmetic processing of 1 frame completes within time Tf for any dynamic image pictures. Or operating frequency range Fmax of general-purpose processor running program is selected as cycle number necessary for arithmetic processing of 1 frame falls within time Tf.

However, when dynamic picture images are actually encoded/decoded, cycle number necessary for arithmetic processing of frame fluctuates wildly, as cycle number necessary for arithmetic processing of each macroblock included in frame as explained above. When arithmetic processing of frame is executed by Fmax as operating frequency of general purpose processor, redundant cycle which processor does not carry out operation arises as shown FIG. 25.

In arithmetic processing in software processing, there is technique which controls dynamically operating power voltage, board bias voltage and operating frequency as power saving method using a character generating redundant cycle (for example Abstract of IEEE International Symposium on Circuits and System 2001 (May, 2001) pp 918-921. etc)

In encoding process in dynamic picture image, processing time of 1 frame is restricted to frame processing time Tf by a rule of encoding system (MPEG etc.) and it is necessary to complete encoding process of 1 frame within the frame processing time Tf. Conversely, encoding arithmetic process have only for encoding arithmetic processing to complete within the frame processing period Tf.

Wherein dynamic control of operation power voltage, board bias voltage and operation frequency, with guaranteed operation completion of data group of a certain number within a certain restricted time, reduces operating frequency preferably, and controlling dynamically power voltage, board bias voltage according to operating frequency intends power saving comprehensively.

In processing dynamic picture image, a predetermined restricted time is one frame time, for example, one 15th second for 15 (frame/second) dynamic picture image and data group of predetermined number can be replaced for macroblock group included in 1 frame.

Patent literature 1: Japanese Unexamined Patent application Publication No. 2003-324735

Patent literature 2: Japanese Unexamined Patent application Publication No. 2005-210525

Non-patent literature 1: IEICE Trans. Fundamentals, Vol. E88-A, No. 12 December 2005. ⦅ower-Minimum Frequency/Voltage Cooperative Management Method for VLSI Processor in Leakage-Dominant Technology Era. (K. Kawakamik M. Kanamori, Y. Morita, J. Takemura, M. Miyama, and M. Yoshimoto)

Non-patent literature 2: IEEE International Symposium on Circuits and System 2001 (May, 2001) pp 918-921 "An LSI for 6 d d MHopping and MPEG4 System Based on the Chip" (H. Kawaguchi, G. Zhang, S. Lee, and T. Sakurai)

DISCLOSURE OF THE INVENTION

Problem to be Solved by the Invention

As describe above, clock gating technology and technology controlling operating frequency and operating power voltage of arithmetic unit is effective technology as a technology reducing power consumption of whole digital VLSI circuit but there is room for improvement.

As one improvement in the case of using clock gating technology for hard wired logic circuit such as ASIC (Application Specific IC) designed for specific process, problems are listed such that ON/OFF of clock signal supply for arithmetic unit and frequency of changing operating power voltage and operating frequency of arithmetic unit in frame processing period and that power consumption becomes large according to the frequency of change. In addition, there is a problem that technology dynamically controlling operating power voltage, board bias voltage and operating frequency applicable to software processing can not be applied to hard wired logic circuit which is ordinarily pipeline processed.

Figure 23:
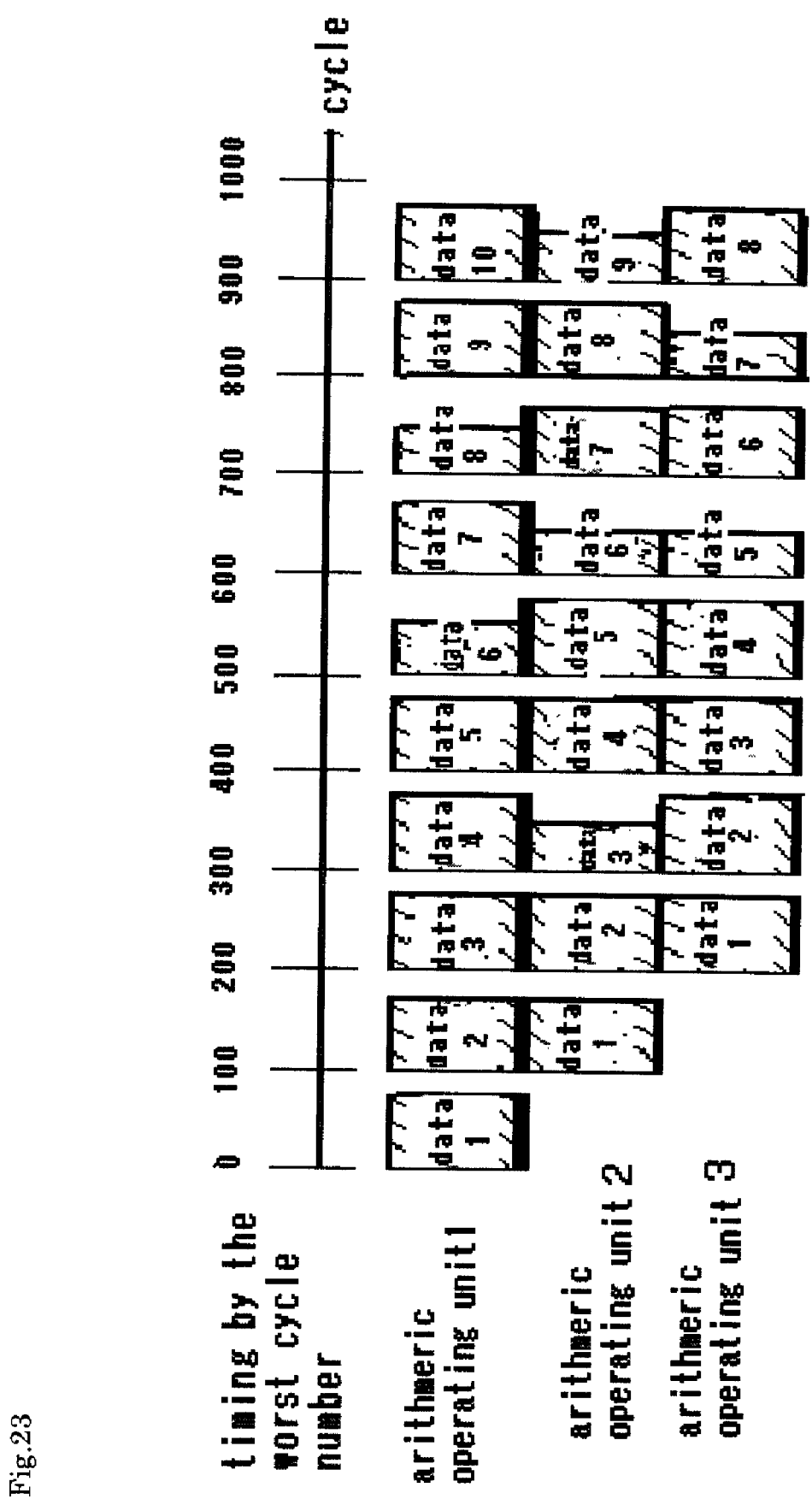
FIG. 23: Time chart diagram showing operating status of arithmetic operation unit in conventional pipeline process
Figure 24:
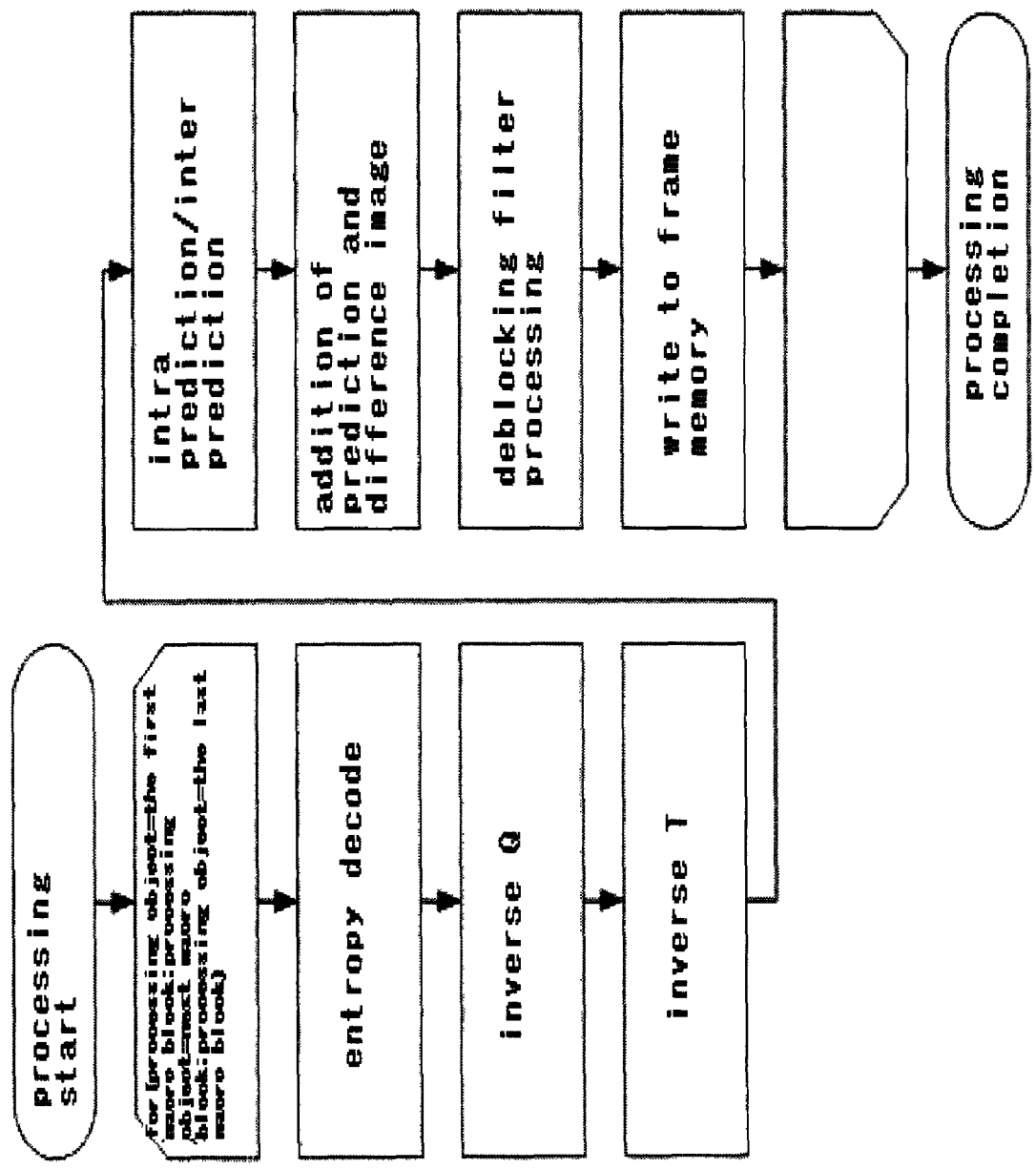
FIG. 24: Flowchart of moving picture processing software.

For pipeline operation repeating operating status and idle status of arithmetic unit, in the case of using conventional clock gating technology, clock gating is executed in non-hatched cycle in FIG. 23 by arithmetic unit but in predetermined restricted time, ON/OFF of clock signal supply for arithmetic unit repeated frequently. Here is a room to improve.

Figure 25:
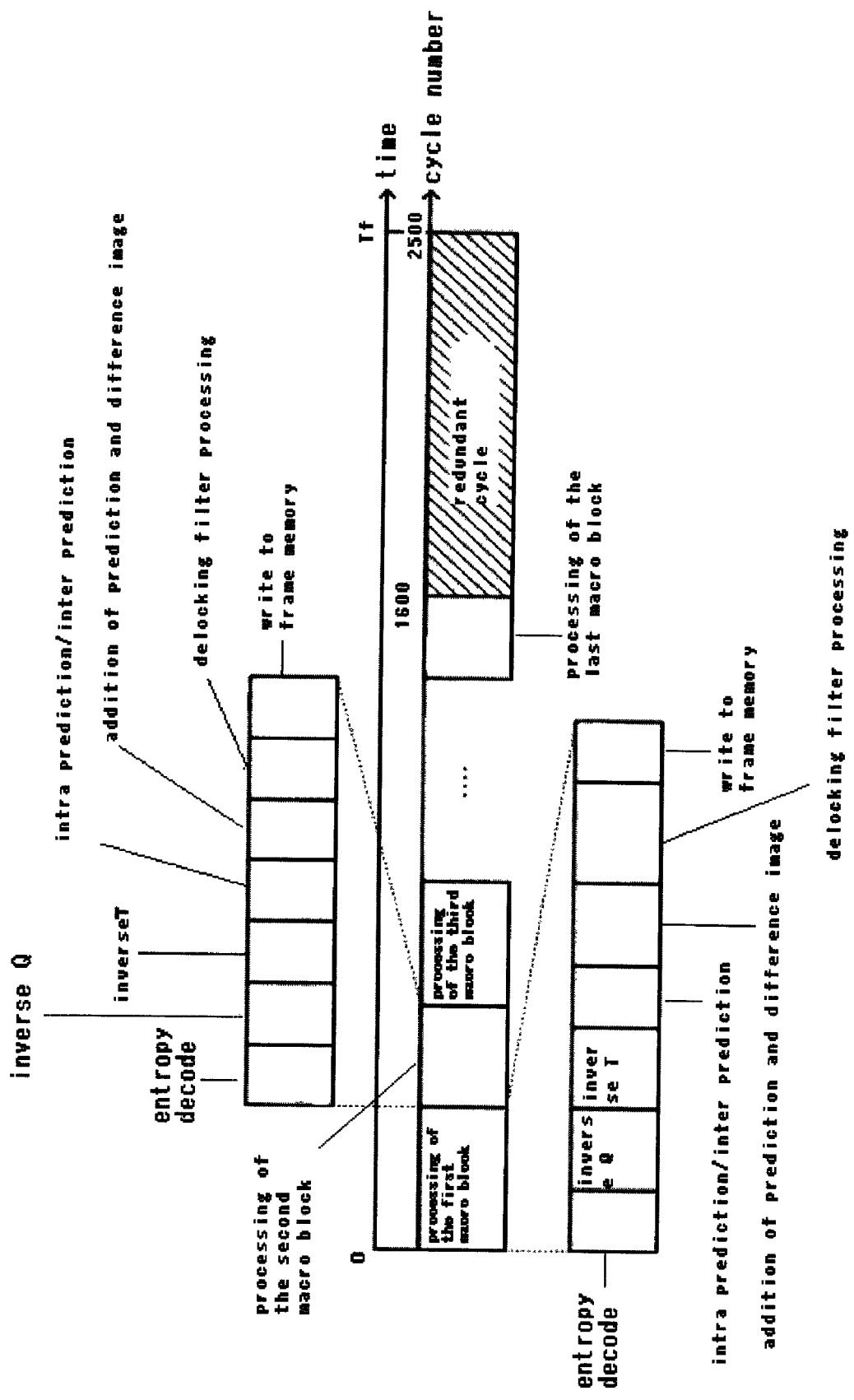
FIG. 25: Figure showing example of cycle necessary for process with moving picture processing software.
Figure 26:
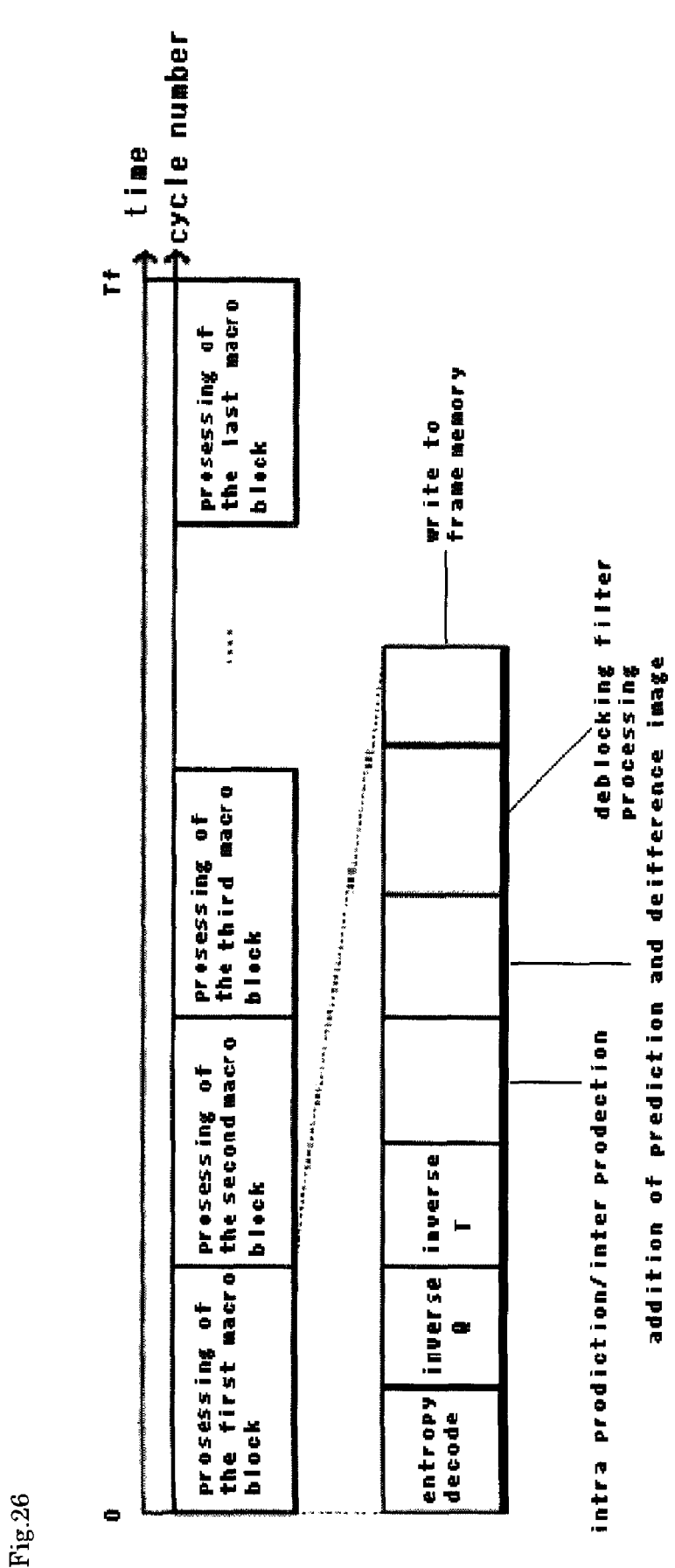
FIG. 26: Figure showing worst cycle number necessary for process with moving picture processing software.
Figure 27:
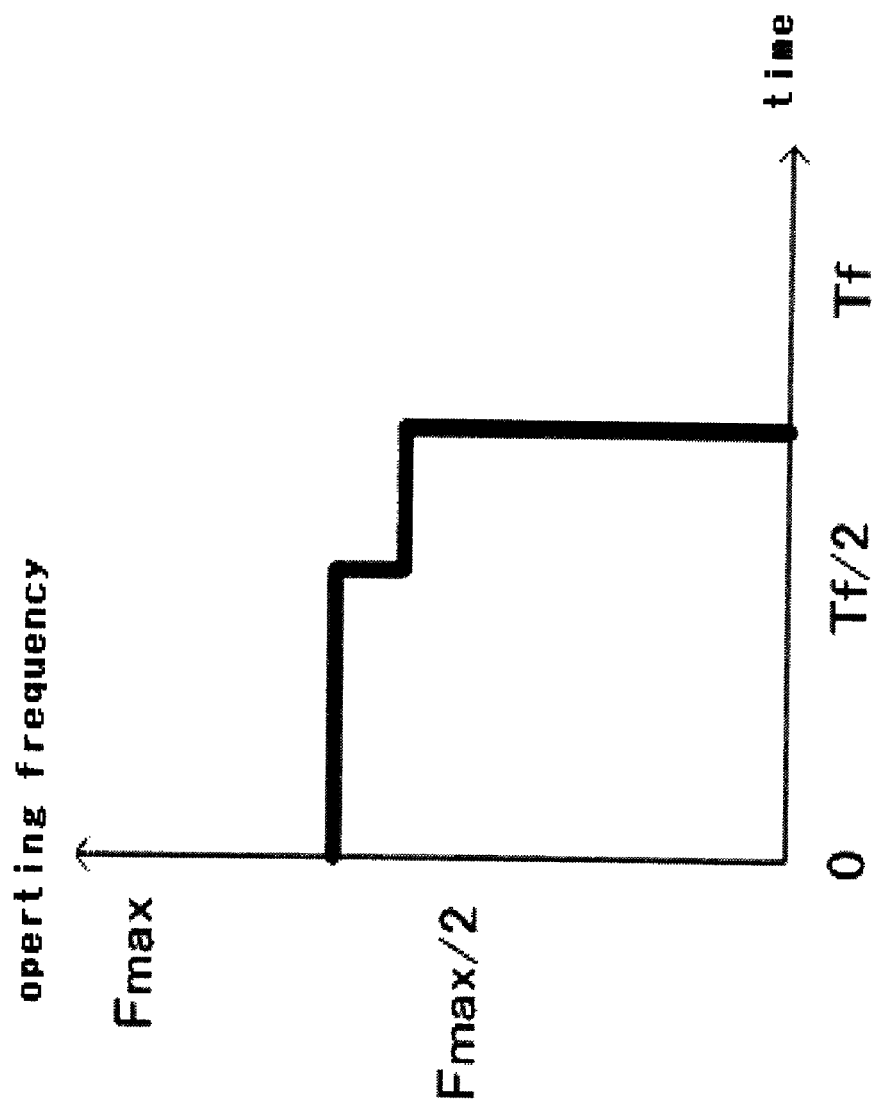
FIG. 27: Graph showing regulation example of operating frequency.

In addition, in design of hard wired logic circuit, even if cycle number necessary for actual processing of each stage comprising pipeline becomes smaller than the worst cycle number, as start cycle of pipeline processing is fixed to cycle determined at designing, pipeline processing can not be accelerated omitting cycle in which all arithmetic unit is in idle status and significant reduction of cycle number could not be done shown in FIG. 25 in software processing.

In example of FIG. 23, for example, in cycle which starts processing of $10^{th}$ data in arithmetic 1, as cycle number necessary for processing from $1^{st}$ to $9^{th}$ data becomes 900 cycles definitely whatever it becomes small, for example, in the case that cycle necessary for processing $10^{th}$ data in arithmetic unit is 10 cycles, total cycle number necessary for processing 1st to $10^{th}$ data in arithmetic unit 1 is 100×9+10=910 cycles and only 90 cycles reduced compares to 100×10=1000 cycles in the case of the worst cycle number for processing 1st to $10^{th}$ data actually.

For example, in dynamic picture image of HDTV resolution comprising 1920×1088 pixel, as 8160 of macroblock is included, in the case that cycle number necessary for processing $8160^{th}$ macroblock in arithmetic unit, in this case cycle number necessary for processing 1 frame is only reduced to (100×8159+10)/(100×8160)×100□0.01%. Therefore, operating frequency of hardwired logic circuit can be reduced only for 0.01% and power saving by dynamic control of operating frequency, power voltage and board bias voltage can not be achieved at all.

Figure 5:
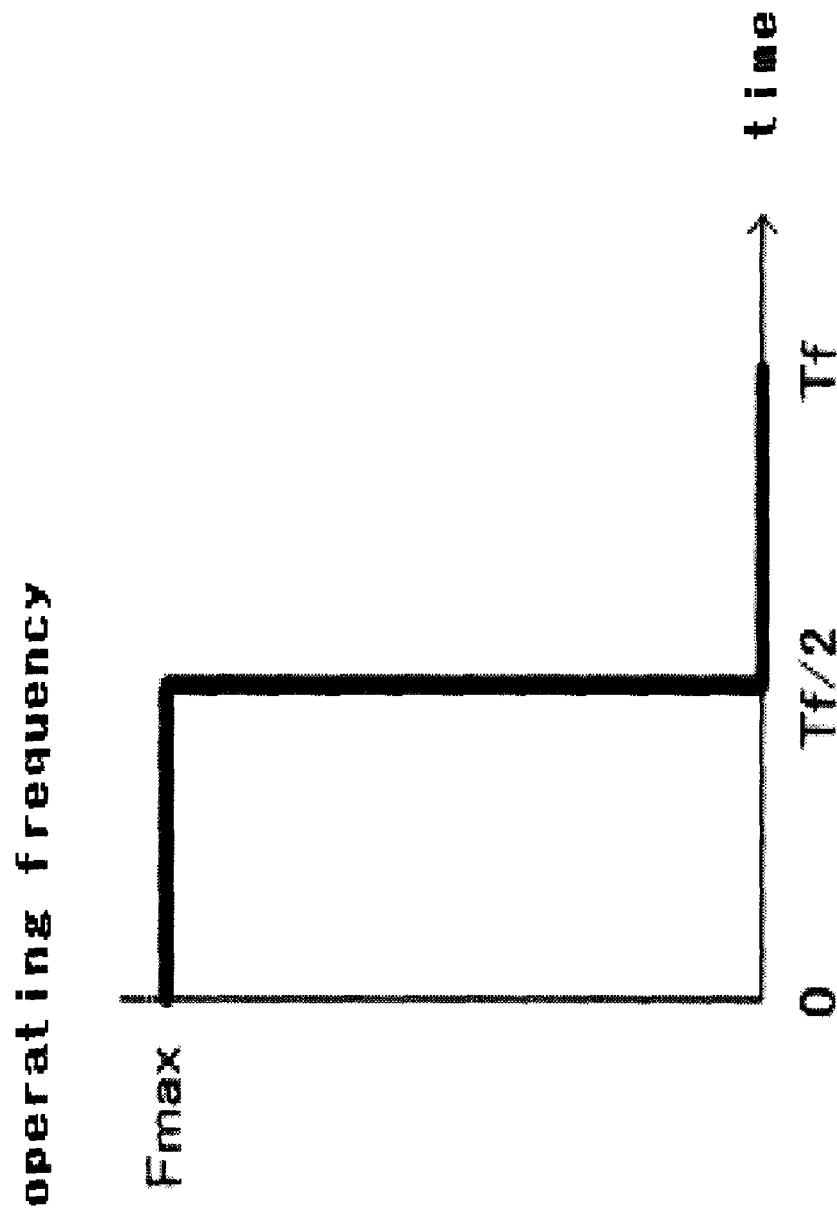
FIG. 5: Control example of operating frequency.
Figure 28:
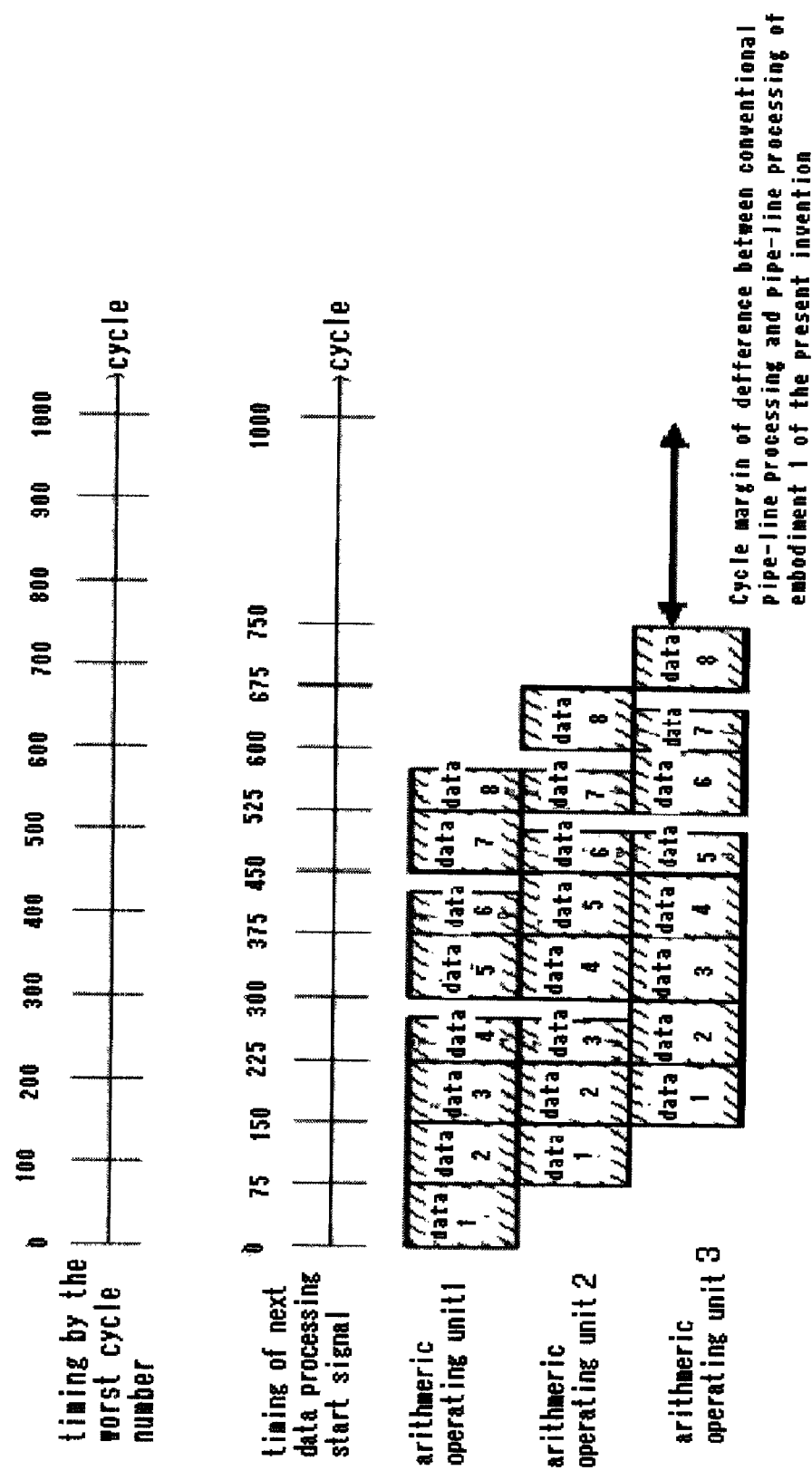
FIG. 28: Proceedings of pipeline operating in digital VLSI circuit of example 2.
Figure 29:
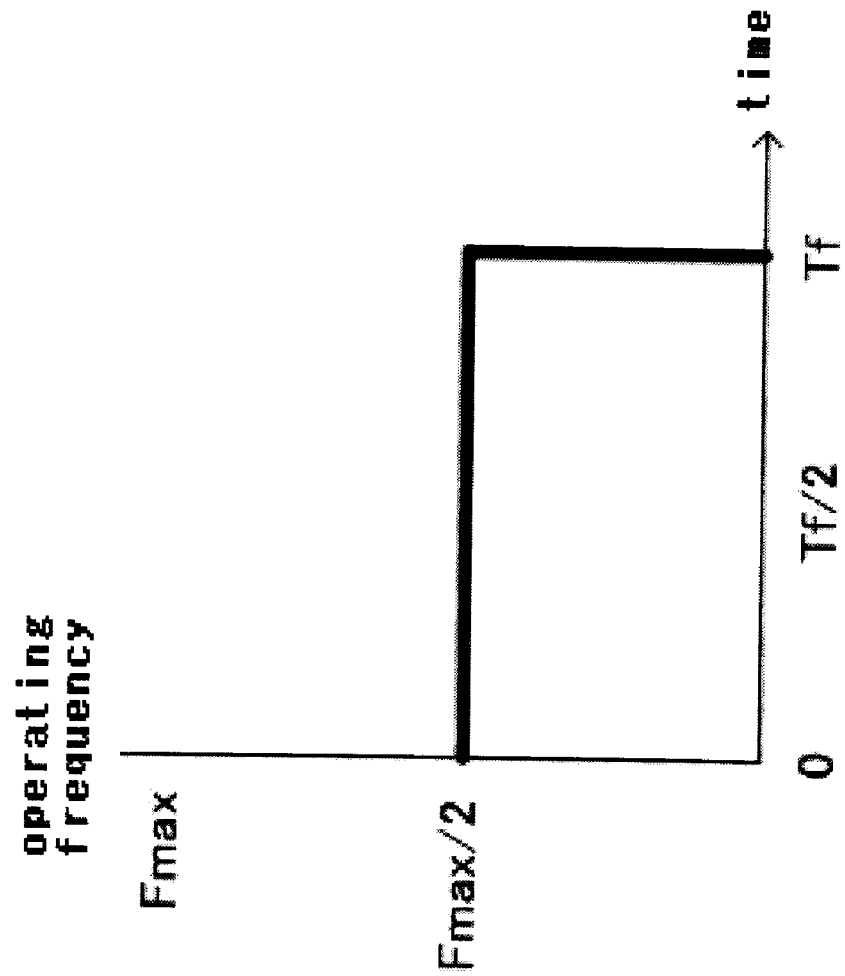
FIG. 29: Graph showing regulation example of operating frequency.

According to the applicant's research, it is known that the shorter operation time of high operating frequency is, the lower the power consumption is reduced when power consumption to achieve arithmetic operation of some cycle number is reduced within restricted time by using dynamic control of operating frequency, power supply voltage, board bias voltage in digital VLSI circuit (general-purpose processor, dedicated digital VLSI circuit including hard-wired logic circuit). (nonpatent literature 1) As executed cycle number is shown in mathematical expression 2, on each of FIGS. 5, 28 and 30 the same cycle number Fmax×Tf/2 is realized during constrained time Tf.

(cycle number)=(operating frequency)×(operating time)     (formula 2)

In the case of executing dynamic control of operating frequency, power voltage and board bias voltage, operating power voltage and board bias voltage are also controlled with controlling operating frequency of digital VLSI circuit. For example, in FIG. 5, from time 0 to Tf/2, operating power voltage and board bias voltage are set to voltage which can achieve operating frequency at appropriate power and from time Tf/2 to Tf, is set to voltage which achieve operating frequency 0 at appropriate power.

In view of the above point, the present invention is intended to provide a digital VLSI circuit to achieve power saving by reducing on/off changeover of clock signal supply to arithmetic unit within a given restricted time, using clock gating technology in actual pipeline arithmetic operating.

In view of the above point, the present invention is intended to provide a digital VLSI circuit to achieve power saving by reducing on/off changeover of power supply to arithmetic operating unit within a given restricted time, controlling power supply to each arithmetic operating unit in real pipeline arithmetic operating.

Moreover in view of the above point, the present invention is intended to provide a dedicated digital VLSI circuit to achieve power saving by controlling operating frequency, operating power supply voltage, and board bias voltage by using cycle allowance generated by reducing redundant cycle in which arithmetic operation unit comprising pipe-line is idle by changing start cycle of pipe-line operations on a digital VLSI circuit with ending cycle of the previous pipe-line operation.

Moreover it is intended to provide image processing systems and mobile terminals incorporated with a digital VLSI circuit of the present invention.

Means for Solving the Problem

To achieve the above purpose, the first digital VLSI circuit of the invention that is assigned to each stage of the pipe-line arithmetic operation is characterized by comprising a plurality of arithmetic operation units for carrying out arithmetic operations in synchronization with a clock signal, a detecting means for detecting completion of the stage in the arithmetic operation assigned to the arithmetic operation unit, wherein the clock signal supply control means stops supplying the clock signal to a certain arithmetic operation unit when the detecting means detects the completion of the arithmetic operation assigned to the same, and restarts supplying the clock signal to all the arithmetic operation units for a net pipe-line arithmetic operation when the detecting means detects the completion of the arithmetic operations assigned to them.

The above composition enables to skip the period when all the arithmetic units are idle, to reduce number of times of start or completion of clock gating and to practice lower power consumption than the conventional clock gating.

The above digital VLSI circuit is characterized that the data relating to the arithmetic processing is dynamic image picture data with frame data which is set a given processing period (frame processing period) including a plurality of macrob-lock data, wherein the arithmetic operating is encoding/decoding process of the dynamic picture image; wherein the clock signal supply means continues to stop clock signal supply for all the arithmetic operating units in arithmetic operation of the last macroblock data in the frame data, even if end of arithmetic operation is detected in all the arithmetic operating unit and after the frame processing period passes, restarts clock signal supply for all the arithmetic operating units for pipeline processing of the next frame data.

The above composition enables to skip the period when all the arithmetic unit is idle, to reduce number of times of start or completion of clock gating and to practice lower power consumption than the conventional clock gating. The pipeline arithmetic operation is performed by macroblock data.

The first digital VLSI circuit is characterized that the data on the arithmetic operation includes a plurality of macroblock data (the macroblock data comprises a plurality of block data) and is the dynamic picture image with frame data which is set a given processing period (frame processing period); wherein the arithmetic operation is encoding/decoding process of the dynamic picture image; and wherein the arithmetic operating unit executes the pipe-line arithmetic operation by block data unit; wherein the clock signal supply control means continue to stop clock signal supply for all the arithmetic operating unit even if end of arithmetic operation in all the arithmetic unit by the detection means in arithmetic operation of the last block data in the last macroblock data in the frame data and restarts clock signal supply for all the arithmetic operating unit for pipeline arithmetic operation of the next frame data after the frame operating period.

The number of blocks included in macroblock is 24 for example.

The above composition enables to skip the period when all the arithmetic operating units are idle, to reduce the number of start and completion of clock gating by performing continuously pipe-line arithmetic operation at arithmetic operating unit, and to improve lower power consumption than conventional clock gating. Pipeline arithmetic operation is executed by block data.

Subsequently the second digital VLSI circuit of the invention which performs each stage of the pipe-line arithmetic operation is characterized by comprising a plurality of arithmetic operation units for carrying out arithmetic operations in synchronization with a clock signal, detecting means for detecting completion of the stage in the arithmetic operation assigned to the arithmetic operation unit, and a clock signal supply control means for controlling supply/stop operation of the clock signal to each arithmetic operation unit; wherein the clock signal supply means stops clock signal supply for the next stage arithmetic operating unit in the case that end of arithmetic operation of the next stage arithmetic operating units detected first by the detection means between the previous stage arithmetic operating unit and the next stage arithmetic operating unit lined in the vicinity in the pipeline arithmetic operation, after stop of clock signal supply for the next stage arithmetic operation unit, restart clock signal supply for the next stage arithmetic operating unit for the next pipeline arithmetic operation in the case that end of arithmetic operation of the previous stage arithmetic operating unit is detected.

In addition, in the 2nd digital VLSI circuit described as above, in the case that end of arithmetic processing of the previous stage arithmetic unit is detected first by the detection means, until the previous stage arithmetic unit can output arithmetically processed data for the next stage arithmetic unit, the clock signal supply control means stops clock signal supply for the previous stage arithmetic unit, after stopping of clock signal supply for the previous stage arithmetic unit; wherein the previous stage arithmetic unit become a status that it can output arithmetically processed data for the next arithmetic unit, restarts clock signal supply for the previous stage arithmetic unit.

By above constitution, as long as processed data can be exchanged between arithmetic unit lined in the vicinity in pipeline control, pipeline processing is executed continuously and seamlessly; wherein start number and end number can be reduced by executing pipeline processing closely in arithmetic unit and power saving can be contemplated.

Next, in the 2nd digital VLSI circuit described as above, data of the arithmetic processing comprises a plurality of macroblock data and is dynamic picture image comprising frame data with restricted time (frame processing time) determined; wherein the arithmetic processing is encoding/decoding process; wherein the arithmetic unit execute the pipeline arithmetic processing by the macroblock data unit;

Wherein the control means of clock signal supply, in arithmetic processing of the last macroblock data in the frame data, after stopping of clock signal supply for the next stage arithmetic unit, even if end of arithmetic processing of the previous stage arithmetic unit, stopping of clock signal supply for the next stage arithmetic unit, after the frame processing period passes, clock signal supply restarts for all the previous stage arithmetic units for pipeline processing of the next frame data.

In addition, in the 2nd digital VLSI circuit, the clock signal supply control means in arithmetic processing of the last macroblock data in the frame data, after stopping of clock signal supply for arithmetic unit of the previous stage, even if arithmetic unit of the previous stage becomes a status in which it can output arithmetically processed data for the next stage arithmetic unit, continue to stop clock signal supply for the previous arithmetic unit, after the frame processing period passes, clock signal supply for all the arithmetic unit for pipeline processing of the next frame data.

By above constitution, as long as exchange of processed data between arithmetic units lined in the vicinity is possible in pipeline control, pipeline processing continues to be executed seamlessly, by executing pipeline processing closely in arithmetic unit, reducing start number and end number of clock gating and power saving can be intended. In addition, pipeline processing execute by macroblock data unit.

Next, the 2nd digital VLSI circuit, data of the arithmetic processing, including a plurality of macrblock data (the macroblock data comprises a plurality of block data), is dynamic picture image data comprising frame data with a certain processing period predetermined; wherein the arithmetic processing is encoding/decoding process; wherein the arithmetic unit execute the pipeline arithmetic processing by the block data unit, Wherein the clock signal supply control means in arithmetic processing of the last block data in the last macroblock data in the frame data, after stopping of clock signal supply for the next stage arithmetic unit, even if end of arithmetic processing in arithmetic unit of the previous stage, continues to stop clock signal supply for arithmetic unit of the next stage, after the frame processing period passes, clock signal supply restarts for all the arithmetic units for pipeline processing of the next frame data.

In addition block number included in macroblock is 24 for example.

In addition, in the above the $2^{nd}$ digital VLSI circuit, the clock signal supply control means continue to stop clock signal supply for the previous stage arithmetic operation unit in arithmetic processing of the last block data of the last macroblock data in the frame data, after stopping of clock signal supply for the previous stage arithmetic operation unit, even if the previous stage arithmetic operation unit becomes status in which it can output processed arithmetic processing data for the next stage arithmetic operation unit, after the frame process period passes, clock signal supply restarts for all the arithmetic operation units for pipeline arithmetic processing of the next frame data.

By above constitution, as long as delivery and receipt of processed data between arithmetic operation units lined in the vicinity in pipeline control, pipeline process is executed seamlessly and continuously, by executing pipeline arithmetic processing in arithmetic operation unit closely, start number, end number of clock gating can be reduced and power saving can be contemplated. In addition, pipeline arithmetic processing is done by block data unit.

In addition, in above 1st or 2nd digital VLSI circuit, it is characterized by comprising feedback control part determining operating power voltage of the arithmetic operation unit and board bias voltage at the processing time in a certain next restricted time and arithmetic operation unit control part controlling operating power voltage, board bias voltage and operating frequency of the arithmetic operation unit where in dynamic control is executed by feedback control on operating power voltage, board bias voltage and operating frequency of the arithmetic operation unit. According to above constitution, by feedback control, control of operating power voltage, board bias voltage and operating frequency can be executed.

In addition, in above the 1st or 2nd digital VLSI circuit, before supplying for the pipeline process, data quantity included in the certain restricted time supplied for the pipeline arithmetic processing is detected and based on process load prediction part which predicts process load of the pipeline arithmetic processing, feed forward control part determining operating power voltage, board power voltage and board bias voltage and calculation control part controlling operating power voltage, board bias voltage and operating frequency. Dynamic control is executed by feed forward control on active power voltage, board bias voltage and operating frequency of the arithmetic operation unit.

According to the above constitution, by feed forward control, control of operating power voltage, board bias voltage and operating frequency can be executed.

Above the 1st or 2nd digital VLSI circuit are one which utilize clock gating technology but power saving by controlling ON/OFF of power supply for arithmetic operation unit is possible. That is, power supply for arithmetic operation unit may be stopped at the timing stopping clock signal supply for arithmetic operation units in clock gating.

For example, the 3rd digital VLSI circuit comprise a plurality of arithmetic operation units executing arithmetic processing working on each stage of pipeline arithmetic processing, detection means for detecting arithmetic processing end of stage in charge in the arithmetic operation unit and power supply control means controlling ON/OFF of power by the arithmetic operation unit. The power supply controlling means stop power supply for the arithmetic operation unit in which arithmetic processing end is detected by the detection means and power supply restarts for all the arithmetic operation units for the next pipeline arithmetic processing if arithmetic processing end is detected in all the arithmetic operation units by the detection means.

By above constitution, period when all the arithmetic operation unit get into idle status can be omitted and power saving can be contemplated similarly. Moreover, by executing pipeline arithmetic processing closely in arithmetic operation unit, start number of power supply and end number of that can be reduced and can intend further power saving.

In the 3rd digital VLSI circuit of the present invention, data of the arithmetic processing includes a plurality of macroblock data and is dynamic picture image data comprising frame data with a certain process period (frame process period); wherein the arithmetic processing is encoding/decoding process of the dynamic picture image; wherein the power supply control part continues to stop power supply for all the arithmetic operation units even if arithmetic processing end is detected in all the arithmetic operation unit by the detection means in arithmetic processing of the last macroblock data of the frame data. After the frame process period, power supply for all the arithmetic operation units restarts for pipeline arithmetic processing of the next frame data.

Next, the fourth digital VLSI circuit of the present invention comprises a plurality of arithmetic operation units executing arithmetic processing working on each stage of pipeline operating process, detection means detecting end of arithmetic processing of stage in charge in the arithmetic operation unit and power supply control means controlling power supply/stop by the arithmetic operating unit; wherein the power supply control means stop power supply for the next stage arithmetic operation unit by the detection method, in the case that arithmetic processing end of the next arithmetic operation unit in the pipeline arithmetic processing is detected first among the previous stage arithmetic operation unit and the next stage arithmetic operation unit lined in the vicinity by the detection means, after stopping of power supply for the next stage arithmetic operation unit, power supply restarts for the next stage arithmetic operation unit for the next pipeline arithmetic processing in the case that arithmetic processing end of the previous stage arithmetic operation unit is detected.

In addition, in the fourth digital VLSI circuit of the present invention, the power supply control means stop power supply for the previous stage arithmetic operation unit, in the case that end of arithmetic processing of the previous stage arithmetic operation unit is detected by the detection means first, until the previous stage arithmetic operation unit can output processed data of arithmetic processing for the next stage arithmetic operating unit, power supply restarts for the previous stage arithmetic operation unit when the status becomes that the previous stage arithmetic operation unit can output processed calculation data for the next stage arithmetic operation unit after it stops power supply for the previous stage arithmetic operation unit.

By above constitution, in pipeline control, as long as processed data can be delivered and received between arithmetic operation units lined in the vicinity, pipeline process is executed seamlessly and rapidly, as generation of idle status of arithmetic operation unit is suppressed as much as possible, further power saving is possible to be contemplated. And by executing pipeline arithmetic processing continuously in arithmetic operation unit, start number and end number of power supply can be reduced In above 3rd or 4th digital VLSI circuit, various changes similar to above 1st or 2nd digital VlSI circuit can be done. For example, clock signal supply is replaced to power supply and clock signal supply control means to power supply control means.

Effects of the Invention

According to the digital VLSI circuit of the present invention, in actual pipeline arithmetic processing, using clock gating technology, by reducing ON/OFF switching of clock signal supply for arithmetic operation unit within restricted time, reducing power consumption can be achieved.

In addition, according to the digital VLSI circuit of the present invention, in actual pipeline arithmetic processing, controlling power supply for each arithmetic operation unit, by reducing ON/OFF switching of power supply for arithmetic operation unit within restricted time, reducing power consumption can be achieved.

In addition, according to digital VLSI circuit of the present invention, in actual pipeline arithmetic processing, cycle number necessary for arithmetic processing of data whose arithmetic processing should be completed within restricted time can be reduced from worst cycle number. Therefore even if operating frequency of digital VLSI circuit within restricted time is decreased, predetermined arithmetic processing can be completed within restricted time and by controlling operating frequency, operating power voltage and board bias voltage properly, reducing power consumption can be achieved.

According to the image processing system of the present invention, in data processing of dynamic picture image, reduction of power consumption is contemplated; integration for various systems required for low power consumption becomes easy and flexible system design becomes possible.

According to mobile terminal of the present invention, decreasing power consumption is contemplated, in small terminal such as mobile phone in data processing of dynamic picture image, encoding and decoding of dynamic picture image can be done and usage of mobile terminal expand variously.

BEST MODE FOR CARRYING OUT THE INVENTION

Examples of the digital VLSI circuit of the present invention will be explained referring to figures in detail below. The present invention can be broadly applied to digital VLSI circuit executing pipeline process but usage for encoding and decoding of dynamic picture image is shown here.

In addition, about ON/OFF of signal, in following examples, it is explained high active and active when logic level is high but it can be low active and a constitution is possible wherein it becomes active when logic level is low.

EXAMPLE 1

Figure 1:
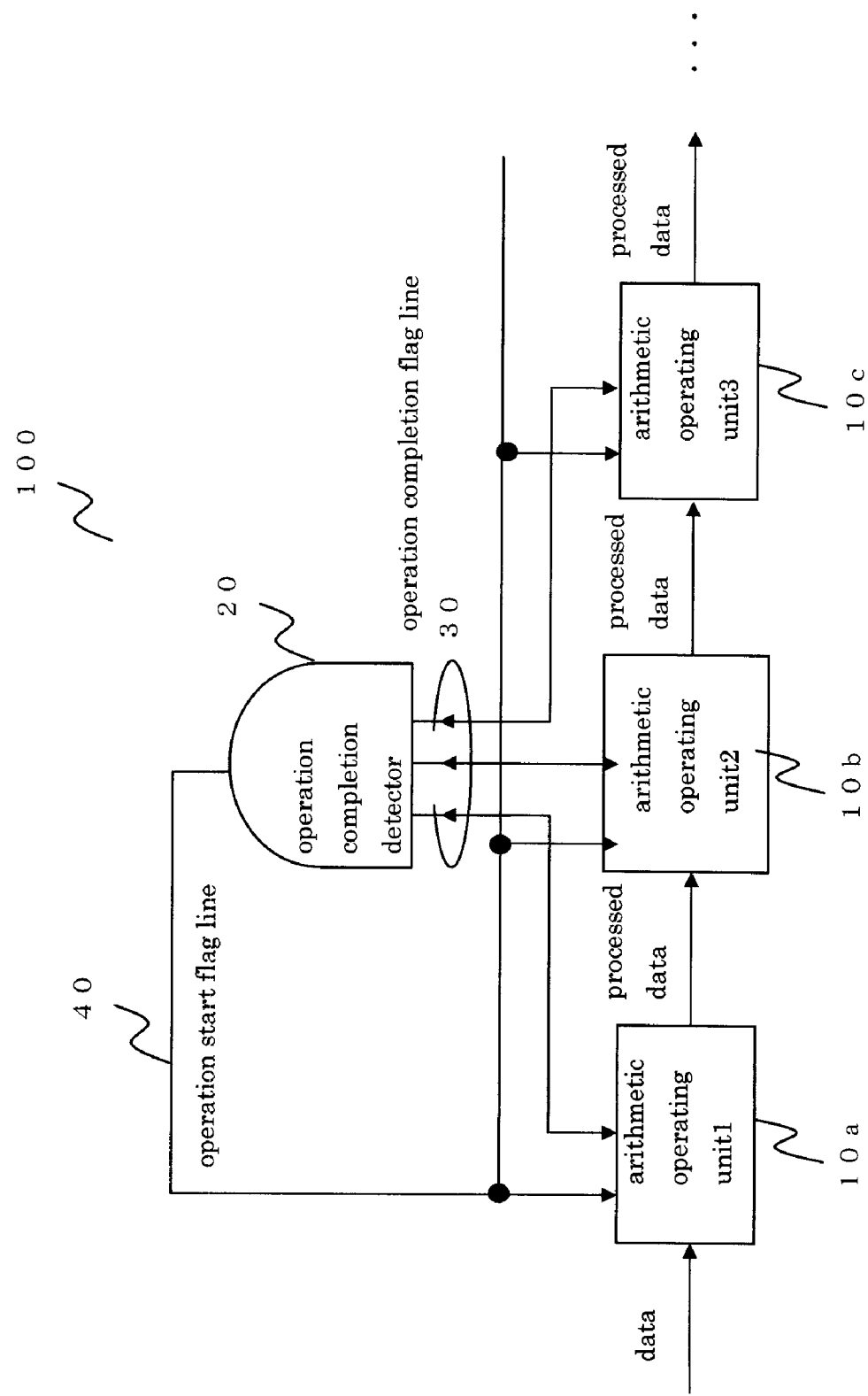
FIG. 1: Diagram showing a digital VLSI circuit of example 1 of the present invention.

FIG. 1 is a diagram showing constitution of the digital VLSI circuit of example 1 of the present invention.

A constitution is that arithmetic operation unit 10a to 10c are connected to process end detector 20 and each arithmetic operation unit 10 and process end detector 20 is connected by end flag line 30 and process start flag line 40.

Only 3 arithmetic operation units, arithmetic operation unit 1 (10a), arithmetic operation unit 2 (10b) and arithmetic operation unit 3 (10c) are shown for convenience. But it goes without saying that design of number of arithmetic operation unit can increase or decrease according to pipeline stage number.

Each arithmetic operation unit 10a to 10c, which performs each stage of pipeline arithmetic processing, executes arithmetic processing in synchronization with clock. If it executes pipeline process of encoding/decoding of dynamic picture image, for example, arithmetic operation unit 1 (10a) handles enthalpy decoding stage, arithmetic operation unit 2 (10b) handles inverse Q process stage and arithmetic operation unit 3 (19c) handles inverse T process stage.

About pipeline process stage after that, figure is omitted. Each arithmetic operation unit is connected sequentially and between previous calculator to next arithmetic operation unit processed data transferred from previous stage to next stage continuously. Arithmetically processed data by each arithmetic operation unit is stored in buffer of each arithmetic operation unit and previous and after arithmetic operation unit transfers data via this buffer. For example, arithmetic processed data is stored in buffer of arithmetic operation unit 1 and is transferred to arithmetic operation unit 2 of the next stage from this buffer. Buffer is constituted with flip-flop or RAM (Random Access Memory) etc.

In FIG. 1, each arithmetic operation unit 10a to 10c is connected for process end detector 20 and arithmetic operation unit establishes end flag when arithmetic processing in charge ends. That is, active signal is output for end flag line 30 connected to process end detector 20. In this example, high signal is output as high active logic (low signal is output in the case of low active logic).

In constitution of the example 1, the end of arithmetic processing of stage in charge in arithmetic operation unit 10 can be detected by the process end detector 20 which detects an end flag establishment of each arithmetic operation unit. In the example 1, process end detector 20 detects the end of arithmetic processing in arithmetic operation unit 10 via an end flag. In addition, the process end detector has AND circuit of multi-input.

Clock gating is conducted against the arithmetic operation unit 10, which ends arithmetic processing. In this example, clock signal supply control means are constructed as that each arithmetic operating unit 10 outputs end flag with temporary stop of clock signal supply when arithmetic processing ends.

Figure 2:
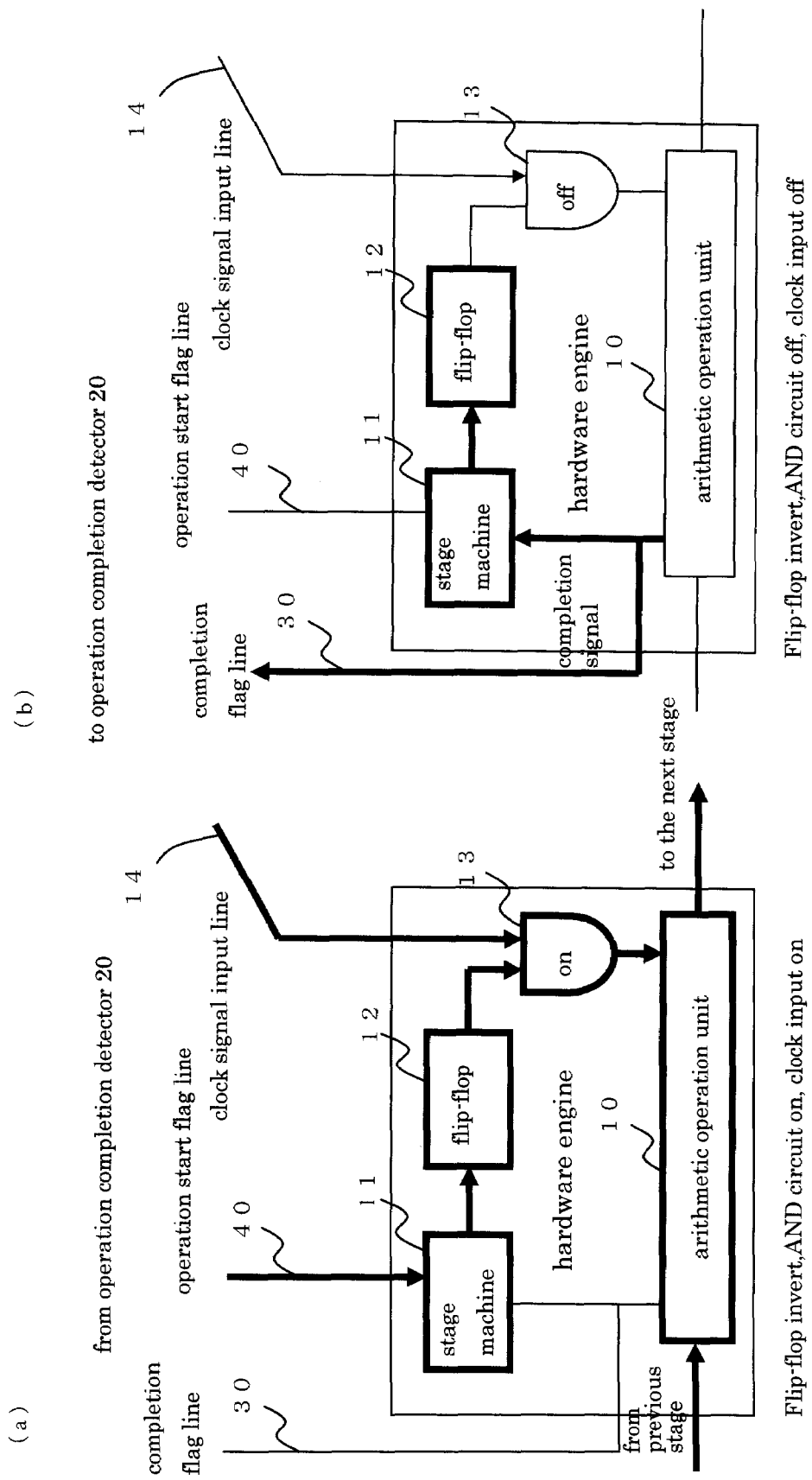
FIG. 2: Figure showing constitution example of clock signal supply control means.

FIG. 2 shows figure showing constitution example of control means of clock signal supply. As shown in FIG. 2, ON/OFF of clock signal supply is controlled automatically by status machine, flip-flop and AND circuit. Status machine 11 is connected to circuit 13 via flip-flop 12. A part of output line of arithmetic operation unit 10 is connected to status machine 11 and a part is connected to flag line 30. FIG. 2(*a*) is a Figure showing process flow at the start of clock signal supply to arithmetic operation unit 10, FIG. 2(*b*) is a figure showing process flow of suspending clock signal supply for arithmetic operation unit 10. As shown in FIG. 2(*a*), now, flip-flop 12 is ON and clock is supplied through AND circuit 13 from clock input line 14.

In FIG. 2(*b*), arithmetic operation unit 10 outputs end signal when an arithmetic processing of pipeline ends. The end signal inputs flip-flop 12 via status machine 11 and flip-flop 12 turns OFF. AND circuit 13 becomes OFF by the off signal. As a result, clock signal supply is terminated which is supplied from clock input line 14 in the state of FIG. 2. (a).

The termination process of the clock signal supply is conducted by each arithmetic operation unit. As a result, clock signal supply is terminated sequentially from the arithmetic operation unit 10 which outputs end flag.

Explanation is continues returning to FIG. 1. Process end detector is multi-input AND circuit and has an architecture in which process start flag signal outputs to process start flag line 40 to restart clock signal supply to all the arithmetic operation unit for next pipeline arithmetic processing when end flags of all the arithmetic operation unit 10*s* are detected (when processes are ended for all arithmetic operation units). Process start flag line 40 is connected to all the arithmetic operation unit 10*s* in parallel and process start flag signal is noticed to all the arithmetic operation unit 10*s* simultaneously.

Each arithmetic operation unit 10 receives process start flag signal, receives the start of clock signal supply and move to next arithmetic processing. As shown in FIG. 2(*a*), process start flag signal inputs flip-flop 12 from process start flag line via status machine 11 and flip-flop terms (from OFF to ON). In the status of FIG. 2(*b*), flip-flop 12 is OFF and clock signal supply is stopped. In the status of FIG. 2(*a*), flip-flop 12 is ON and clock signal supply to arithmetic operation unit 10 restarts via AND circuit 13. The clock signal supply restarts simultaneously at all arithmetic operating unit 10.

In the example 1, a system of clock signal supply/stop control based on above mentioned constitution of regulation is a control means of clock signal supply. As above, according to the constitution of the example 1, in pipeline process, clock signal supply terminate sequentially from arithmetic operation unit 10 which ends arithmetic processing of a stage in charge and clock signal supply for all arithmetic operation unit 10 restarts simultaneously for next pipeline process in the case that arithmetic processing of all arithmetic operation unit 10 end.

Figure 3:
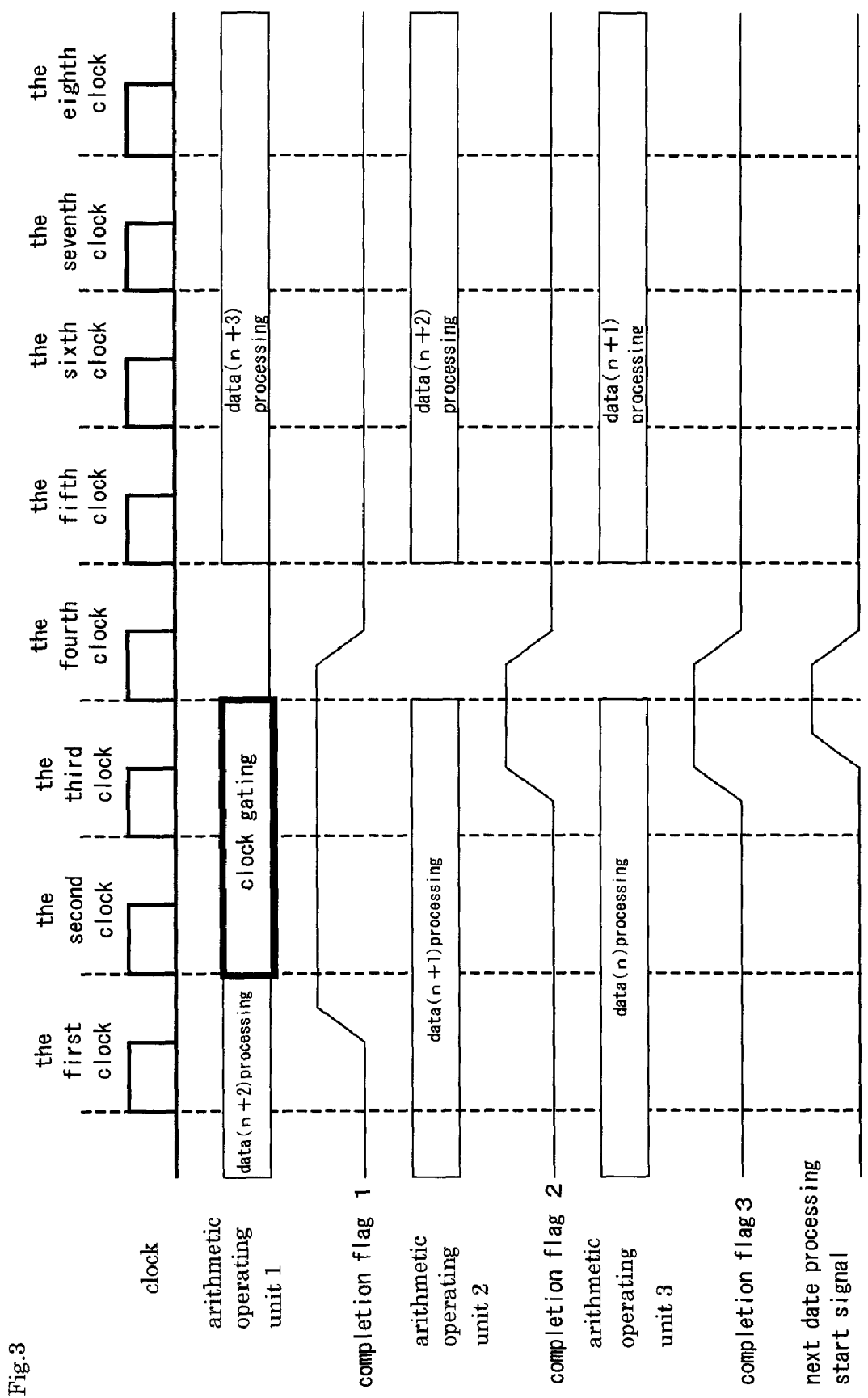
FIG. 3: Timing chart showing pipeline process by digital VLSI circuit of example 1.

FIG. 3 is a timing chart showing pipeline process by digital VLSI circuit of example 1. In this timing chart, only 3, arithmetic operation unit 1 (10*a*), arithmetic operation unit 2 (19*b*), arithmetic operation unit 3 (10*c*) are shown as arithmetic operation units.

In timing chart of FIG. 3, at the time of 1st clock, arithmetic operation unit (10*a*) processes date (n+2), data (n+1) is processed in arithmetic operation unit 2 (10*b*) and data (n) is processed in arithmetic operation unit 3 (10*c*). When digital VLSI circuit is constructed as macroblock pipeline data (n) may be exchanged to macroblock (n) and when it is constructed as block pipeline data (n) may be exchanged to block (n).

Data (n+2) processing in arithmetic operation unit 1 (10*a*) completes at the 1st clock in the figure. Arithmetic operation unit 1 (10*a*) establishes an end flag at the 1st clock, notices arithmetic processing end from flag line 30 for process end detector and executes clock gating. That is, as shown in FIG. 2(*b*), clock signal supply is suspended.

Process of data (n+1) in arithmetic operation unit 2 (10*b*) ended at the 3rd clock in the figure. Arithmetic operation unit 2 raise an end flag at the 3rd clock and notifies from end flag line 30 for process end detector 20. In this case, as stated later, by process start signal of process end detector, it moves to next macroblock process without transition to clock gating.

Process of macroblock (n) in arithmetic operating unit 3 (10*c*) finished in the 3rd clock in the figure. Arithmetic operation unit 3 raises end flag at the 3rd clock and notifies arithmetic processing end from flag line 30 to process end detector 20. In this case, as stated later, it moves to next macroblock process without transition to clock gating by process start signal of process end detector.

Process end detector 20 conduct AND process about end flag signal of arithmetic operation unit 1 (10*a*), arithmetic operation unit 2 (10*b*) and arithmetic operation unit 3 (10*c*). In this example, at the 3rd clock, all end flags from arithmetic operation unit 1 (10*a*), arithmetic operation unit 2 (10*b*), arithmetic operation unit 3 (10*c*) raised and AND condition is established. Process end detector 20 outputs process start flag signal to process start flag line 40 for next pipeline arithmetic processing to restart clock signal supply for all arithmetic operation unit 10. As output line of process end detector 20 is connected in parallel to all arithmetic operation unit 1 (10*a*), arithmetic operation unit 2 (10*b*), arithmetic operation unit 3 (10*c*), process start flag signal is notified to all arithmetic operation unit 1 (10*a*), arithmetic operation unit 2 (10*b*), arithmetic operation unit 3 (10*c*) simultaneously. When arithmetic operation unit 1 (10*a*), arithmetic operation unit 2 (10*b*) and arithmetic operation unit 3 (10*c*) receives process start flag signal, clock signal supply restarts all together and they move to arithmetic processing of next pipeline.

In the 4th clock, arithmetic operation unit 10, when it receives clock signal supply start, initially, makes end flag inactive. In this example, it is converted to low, as it is high active. Next, the next pipeline process starts. Arithmetic operation unit 1 (10*a*) starts process execution for data (n+3), arithmetic operation unit 2 (10*b*) starts process execution for data (n+2) and arithmetic operation unit 3 (10*c*) starts process execution for data (n+1).

Figure 4:
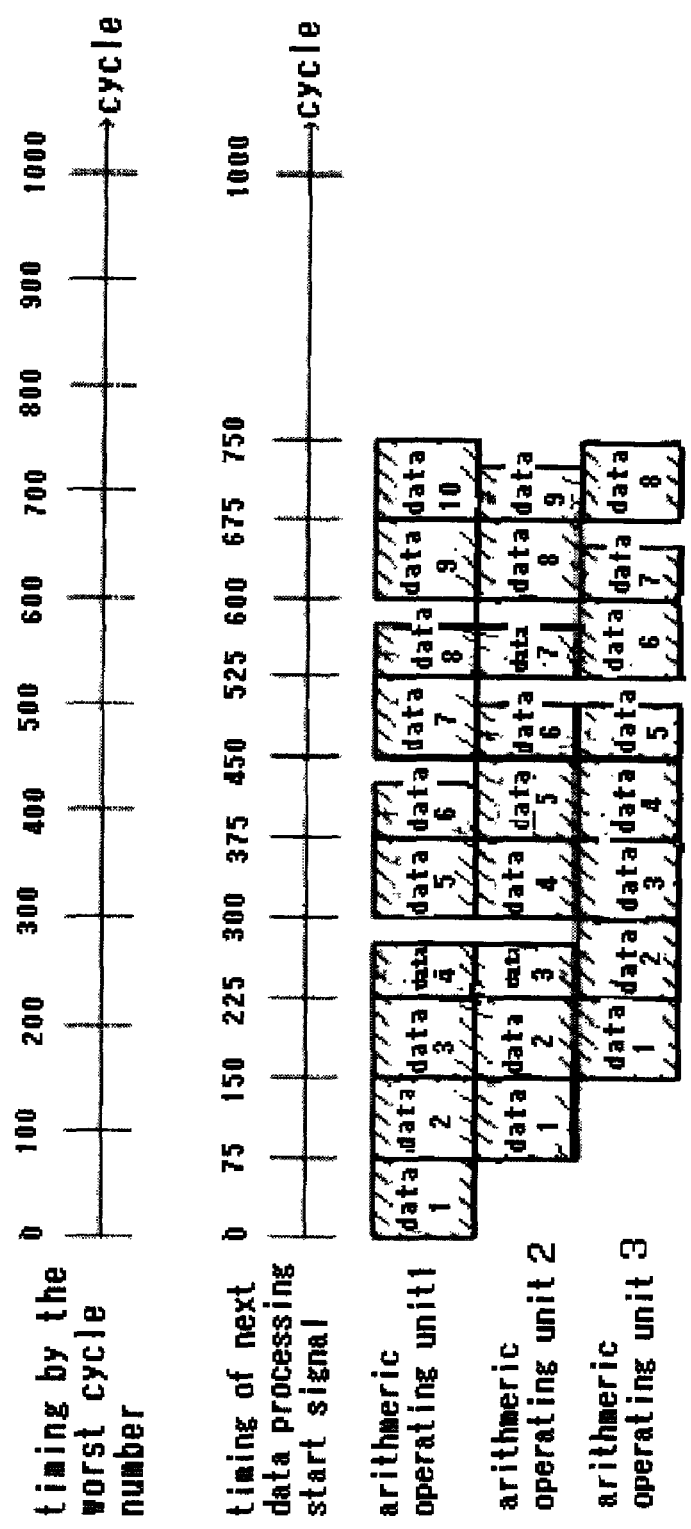
FIG. 4: Diagram showing proceeding of pipeline operating in digital VLSI circuit of example 1.

FIG. 4 is a view showing proceedings of pipeline processing in digital VLSI circuit in example 1.

At vertical line, each arithmetic operation unit such as arithmetic operation unit 1, 2, 3 etc. is aligned. When process by Arithmetic operation unit 1 (10*a*) end, arithmetically processed data is transferred to arithmetic operation unit 2 (10*b*) and processed by arithmetic operation unit 2. When the process ends, data processed by arithmetic operation unit is transferred to arithmetic operation unit 3 (10*c*) and processed by arithmetic operation unit 3. Pipeline process flow is developed vertically like this.

Horizontal line is timing. In the 1st level, timing (timing 0 1000) is shown in the case that pipeline process is conducted saving worst cycle number by conventional technique. In the 2nd level, timing (timing 0 1000) is shown in the case that pipeline process of digital VLSI circuit of example 1 of the present invention is executed. In FIG. 4, hatched parts shows periods executing arithmetic processing and non-hatched parts shows clock gating periods from the arithmetic processing end to next data process execution.

As shown in timing chart of FIG. 4, the start timing is the same all together about data process of each arithmetic operation unit. That is, when process end detector 20 notifies process start flag signal simultaneously, process of pipeline stage of each arithmetic operation unit in charge starts all together at the timing.

The timing is the output timing (timing showed in the 2nd level) of process start flag signal from process end detector 20. As understood from timing chart of FIG. 4, among arithmetic operation unit 10, one whose pipeline in charge early ended is conducted clock gating till pipeline process in other arithmetic operation unit 10 ends. For example, arithmetic operation unit 1 (19a) has clock gating periods, between 275 cycles and 300 cycles, between 425 cycles and 450 cycles and between 575 cycles and 600 cycles.

As it is obvious from comparison of timing chart of FIG. 4 and FIG. 23, total sum of area of hatched area of FIG. 4 and FIG. 23 are the same between pipeline moving process in digital VLSI circuit of conventional technique and pipeline moving process in digital VLSI circuit of FIG. 1 of the present invention. That is, total sums of cycle number in periods of each arithmetic operation unit moving are the same. In similar way, total sums of area of non-hatched part are the same and total sum of time of clock gating is understood to be the same. That is, effect of low electric power consumption by elongating execution time of clock gating is fundamentally the same both in FIG. 4 and in FIG. 23.

But, in FIG. 4 of the example 1 of the present invention, number of clock signal supply stop by clock gating start and the number of clock signal supply start by clock gating stop by execution of arithmetic processing of each arithmetic operation unit as continuous process stacking as possible.

For example, in FIG. 4, observing pipeline process till arithmetic operation unit 1 completes a process of data 9, the number of clock gating start in arithmetic operation unit 1 is 3 times (275 cycles, 425 cycles, 575 cycles) and the number of clock gating stop is 3 times. As for arithmetic operation unit 3, the number of clock gating start is 3 times and the number of clock gating stop is 3 times. On the contrary, in FIG. 23, as clock gating occurred every one pipeline process, observing pipeline process till arithmetic operation unit 1 complete a process of data 9, the number of clock gating start in arithmetic operation unit 1 is 9 times and the number of clock gating start is 9 times. In a similar way, as for arithmetic operation unit 2, the number of clock gating start is 8 times and the number of clock gating stop is 8 times. As for arithmetic operation unit 3, the number of clock gating start is 7 times and the number of clock gating stop is 7 times.

Like this, obviously, the number of clock gating start and that of clock gating stop decreased. The number of 9 times pipeline process execution was compared as above; the difference increases as the number of pipeline process execution is increased. It is understood that both the number of clock gating start and that of clock gating stop of the digital VLSI circuit of the present invention decrease than those of conventional digital VLSI circuit. For example, as 1 frame of HDTV image (1920×1088 pixel) comprises 8160 macroblock, execution number of pipeline process is 8160 times in the case of executing a process of HDTV image by macroblock pipeline.

Next, movement at the end of pipeline process of last macroblock included in frame is explained.

Arithmetic operation unit 10 which executes encoding/decoding by pipeline arithmetic processing by macro pipeline data unit, as above, there exists time for executing macroblock process included in next frame within process time of 1 frame as pipeline process is stacked in arithmetic operation unit 10.

For example, in FIG. 4, in the case that macroblocks included in 1 frame in FIG. 4 are 8, arithmetic operation unit 1 completes macroblock process of 1 frame by 575 cycles and there exists cycle for executing macroblock included in next frame until 750 cycle when last level arithmetic operation unit 3 completes 8th macroblock process. However, moving picture process comprising frame data as process period is determined within limited time about process period of 1 frame, after arithmetic operation unit 1 completes last macroblock process included in frame, it does not execute macroblock process included in next frame. Arithmetic operation unit 2 does not execute macroblock process included in next frame neither.

Therefore, in arithmetic processing of last macroblock data in frame data, a system is employed that even if end of arithmetic processing are detected in all arithmetic operation unit 10s by process end detector, stopping of clock signal supply to all arithmetic operation unit 10 is continued and that restarts clock signal supply to all arithmetic operation unit 10 for pipeline arithmetic operation of the next frame data.

For example, a system is conceivable in which end signal is not output even if arithmetic operation unit 10 ends arithmetic processing of last macroblock. In this case, end process detector 20 by other means, receives end notice of frame process period from control part (not shown) and outputs process start flag signal to process start flag line.

Otherwise, for example, a system is conceivable that arithmetic operation unit 10 outputs end signal when last macro block arithmetic processing ends and that it outputs with attribute signal, last macroblock process end. In this case, process end detector 20, until receiving end notice of frame process period from control part (not shown), waits output of process start flag signal to process start flag line and after receiving end notice of frame process period, outputs process start flag signal to process start flag line.

As shown in FIG. 4, after arithmetic processing of last macroblock ends, period for continuing clock gating.

As above, till start of next frame process period, as clock gating is continuously executed collectively, start number of time, end number of time is counted once.

As above, by reducing number of time of clock gating start and that of stop, lesser power consumption is achieved.

In addition, digital VLSI circuit of above example 1 is comprised of execution of pipeline arithmetic processing by macroblock unit (macroblock data is composed by a plurality of block data. In addition, often composed of 24) but it can be composed of block units.

In the case of executing pipeline process by block unit, arithmetic operation unit executes pipeline arithmetic processing by block data unit, control means of clock signal supply, in arithmetic processing of last block data in last macroblock data in frame data, even if ends of arithmetic processing in all arithmetic operation units are detected by detection means, suspension of clock signal supply for all arithmetic operation units is continued and after frame process period, clock signal supply for all arithmetic operation units restarts for pipeline arithmetic processing of next frame data.

As above, according to digital VLSI circuit of the example 1, as obvious from comparison of FIG. 4 and FIG. 23, number of time of clock gating start and that of clock gating stop decrease and further power reduction is improved.

EXAMPLE 2

Example 2 is an example of digital VLSI circuit comprising executing arithmetic processing closely with cooperation of shakehand type between arithmetic operation units previous and next pipeline process, reducing number of time of clock gating start and clock gating stop and reducing low power. In addition, in the example 2, unit of pipeline arithmetic processing is explained as constitution of macroblock unit but constitution of block unit is also possible.

Figure 6:
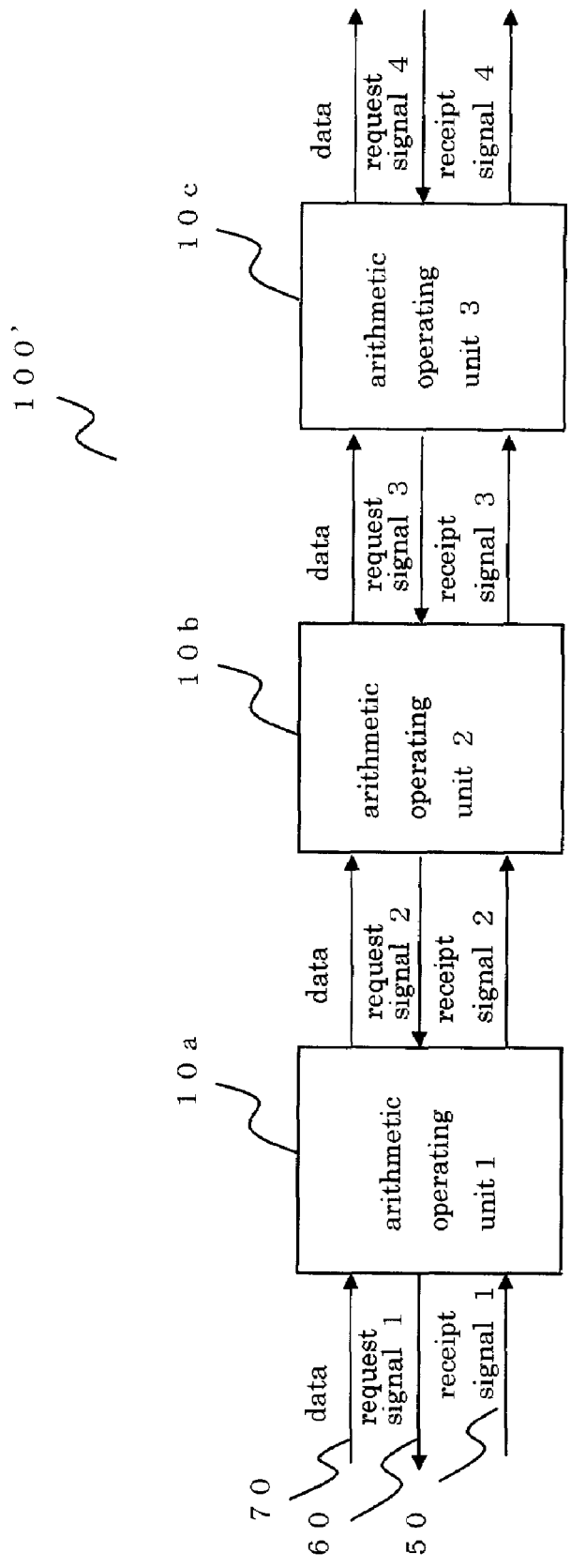
FIG. 6: Diagram showing constitution of digital VLSI circuit of example 2 of the present invention.

FIG. 6 is a diagram showing digital VLSI circuit of example 2 of the present invention.

Constitution is that previous and next arithmetic operation units 10a to 10c connected sequentially in line of pipeline arithmetic processing and that arithmetic operation units cooperate by handshaking between them.

Arithmetic operation unit 10 is shown only 3 of arithmetic operation unit 1 (10a), arithmetic operation unit 2 (10b) and arithmetic operation unit 3 (10c) for convenience of graphical display but it goes without saying that design of increasing or decreasing the number of arithmetic operation units according to pipeline stage number is possible.

Each arithmetic operation unit 10a to 10c have each stage of pipeline arithmetic processing and execute arithmetic processing synchronize with clock. As pipeline process for encoding/decoding is executed here, for example, arithmetic operation unit 1 (10a) has entropy-decoding stage, arithmetic operation unit 2 (10b) has inverse Q process stage and arithmetic operation unit 3 (10c) has inverse T process stage.

Pipeline process stage after that is diagrammatically omitted. Each arithmetic operation unit is connected sequentially and processed data is transferred previous stage to next stage continuously between previous and next arithmetic operation units. Arithmetically processed data by each arithmetic operation unit are stored in buffer provided for each arithmetic operation unit and previous and next arithmetic operation unit transfer data via this buffer. For example, arithmetic processed data by arithmetic operation unit 1 is stored in buffer provided for arithmetic operation unit 1 and transferred from this buffer to next stage arithmetic operation unit 2. Buffer is constituted with flip-flop or RAM (Random Access Memory) etc.

As shown in FIG. 6, previous stage arithmetic operation unit 10 and next stage arithmetic operation unit 10 exchange request signals and receipt signals and in the case that exchange of both signals established processed data is transferred from previous stage arithmetic operation unit 10 to next stage arithmetic operation unit 10.

Each arithmetic operation unit is connected with previous and next arithmetic operation units in the line of pipeline process via 3 lines of receipt signal line 50, request signal line 60 and data line 70 respectively.

Arithmetic operation unit of Digital VLSI circuit and clock signal supply control means of the example 2 for example, are constituted as acting according to following 7 rules.

(Rule 1) When arithmetic operation unit 10 of the stage ends itself process, it output receipt signal for next stage arithmetic operation unit 10 via receipt signal line 50 and transmit completion of preparation for passing of self processed data.

(Rule 2) When next stage arithmetic operation unit 10 ends itself process, it outputs request signal for arithmetic operation unit 10 of the stage via request signal line 60 and transmits completion for preparation for passing data from arithmetic operation unit 10 of the stage.

(Rule 3) arithmetic operation unit 10 of the stage and arithmetic operation unit 10 of the next stage exchange situation of passing data mutually and execute passing of data when both arithmetic operation units are confirmed to complete preparation for passing data.

(Rule 4) When arithmetic operation unit 10 of the previous stage ends itself process, it outputs receipt signal for arithmetic operation unit 10 of the stage via receipt signal line 50 and transmit completion of preparation for passing self-processed data.

(Rule 5) When arithmetic operation unit 10 of the stage ends itself process, it outputs for arithmetic operation unit 10 of the previous stage via request signal line 60 and transmit completion of preparation for data passing from arithmetic operation unit 10 of the previous stage.

(Rule 6) arithmetic operation unit 10 of the previous stage and arithmetic operation unit 10 of the stage exchange situation of data passing mutually and execute passing of data when both arithmetic operation units are confirmed to complete preparation for passing data.

(Rule 7) Arithmetic operation unit 10 does not start next data process until it outputs processed data to next stage arithmetic operation unit 10.

According to above 7 rules, between the previous and the next arithmetic operation unit of pipeline process with cooperation of handshake type arithmetic processing of pipeline is executed closely, decrease the number of time of clock gating start and the number of time of clock gating stop and lower power is promoted.

Figure 7:
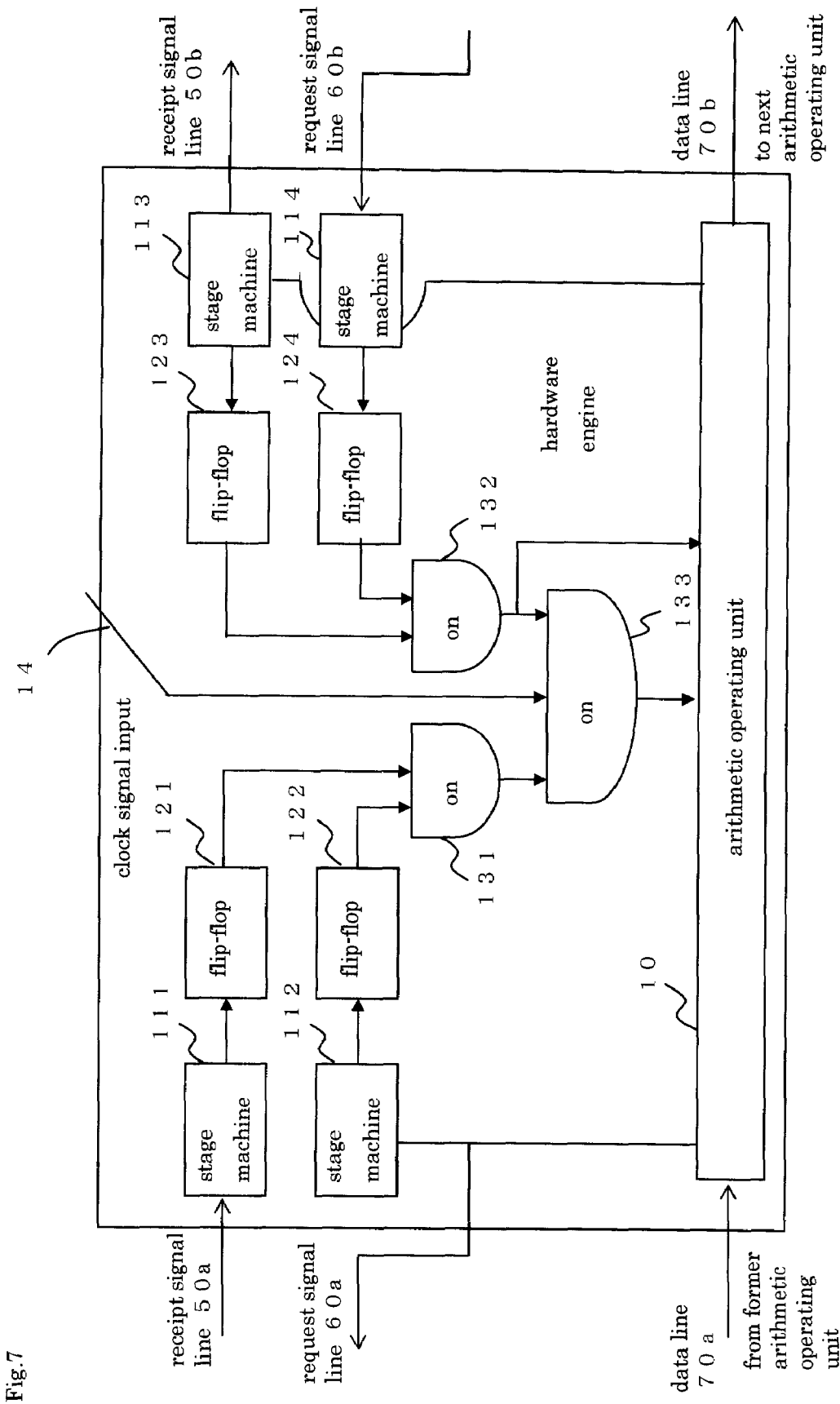
FIG. 7: Figure showing one example in detail of constitution of arithmetic operation unit 10 of example 2 and clock signal supply control means.

Control means for clock signal supply is not limited if circuit constitution realizing above rules specifically. FIG. 7 shows an example of constitution of arithmetic operation unit 10 control means for clock signal supply of the example 2.

As shown in FIG. 7, ON/OFF of clock signal supply is controlled automatically by 4 status machine (111 to 114), 4 flip-flop (121 to 124) and 3 AND circuit (131 to 133).

Relation of connection between arithmetic operation unit 10 of the stage and arithmetic operation unit 10 of the next stage is as follows. Receipt signal line 50b is connected to AND circuit 132 from status machine 113 via flip-flop 123. And request signal line 60b is connected to AND circuit 132 from status machine 114 via flip-flop 124.

By both receipt signal line 50b and request signal line 60b become active (high), AND circuit becomes ON. That is, in the case that AND circuit 132 becomes ON, handshake is established between arithmetic operation unit 10 of the stage and arithmetic operation unit 10 of the next stage and data passing between them is possible. Above rule 1, rule 2 and rule 3 are established in this condition. If arithmetic operation unit 10 of the next stage already output processed data, rule 7 is also established.

At this moment, system is that output of AND circuit 132 is input to arithmetic operation unit 10 directly, that handshake between arithmetic operation unit 10 of the stage and that arithmetic operation unit 10 of the next stage is established and status in which data passing between them is possible can be detectable. Constitution example is that arithmetic operation unit 10 can pass processed data to arithmetic operation unit 10 of the next arithmetic operation unit 10.

Meanwhile, connection relation between arithmetic operation unit 10 of the stage and arithmetic operation unit 10 of the previous stage is as follows.

Receipt signal line 50a is connected to AND circuit 131 from status machine 111 via flip-flop 121. In addition, request signal line 60a is connected to AND circuit 131 from status machine 112 via flip-flop 112.

By both receipt signal line 50a and request signal line 60a becoming active (high), AND circuit 131 becomes ON. That is, in the case that AND circuit 131 becomes ON, handshake between the arithmetic operation unit 10 and arithmetic operation unit of the previous stage is established and status is that data passing is possible between both. In this condition, above rule 4, rule 5 and rule 6 are established.
However, unless rule 7 is established in arithmetic operation unit 10 of the stage, data passing of the real data does not executed. For example, if processed data of arithmetic operation unit 10 of the stage is already output to arithmetic operation unit 10 of the next stage, rule 7 is fulfilled and data passing occurred between arithmetic operation unit of the previous stage and arithmetic operation unit of the stage.

Example of operation is shown in constitution example shown in FIG. 7.
First, the 1st operating example is an operating example of flow in the case that pipeline process of arithmetic operation unit 10 of the stage end first, that pipeline process of arithmetic operation unit 10 of the next arithmetic operation unit 10 and that pipeline process of arithmetic operation unit 10 of the previous arithmetic operation unit 10. The flow is explained by dividing FIG. 8 to FIG. 10.

Figure 8:
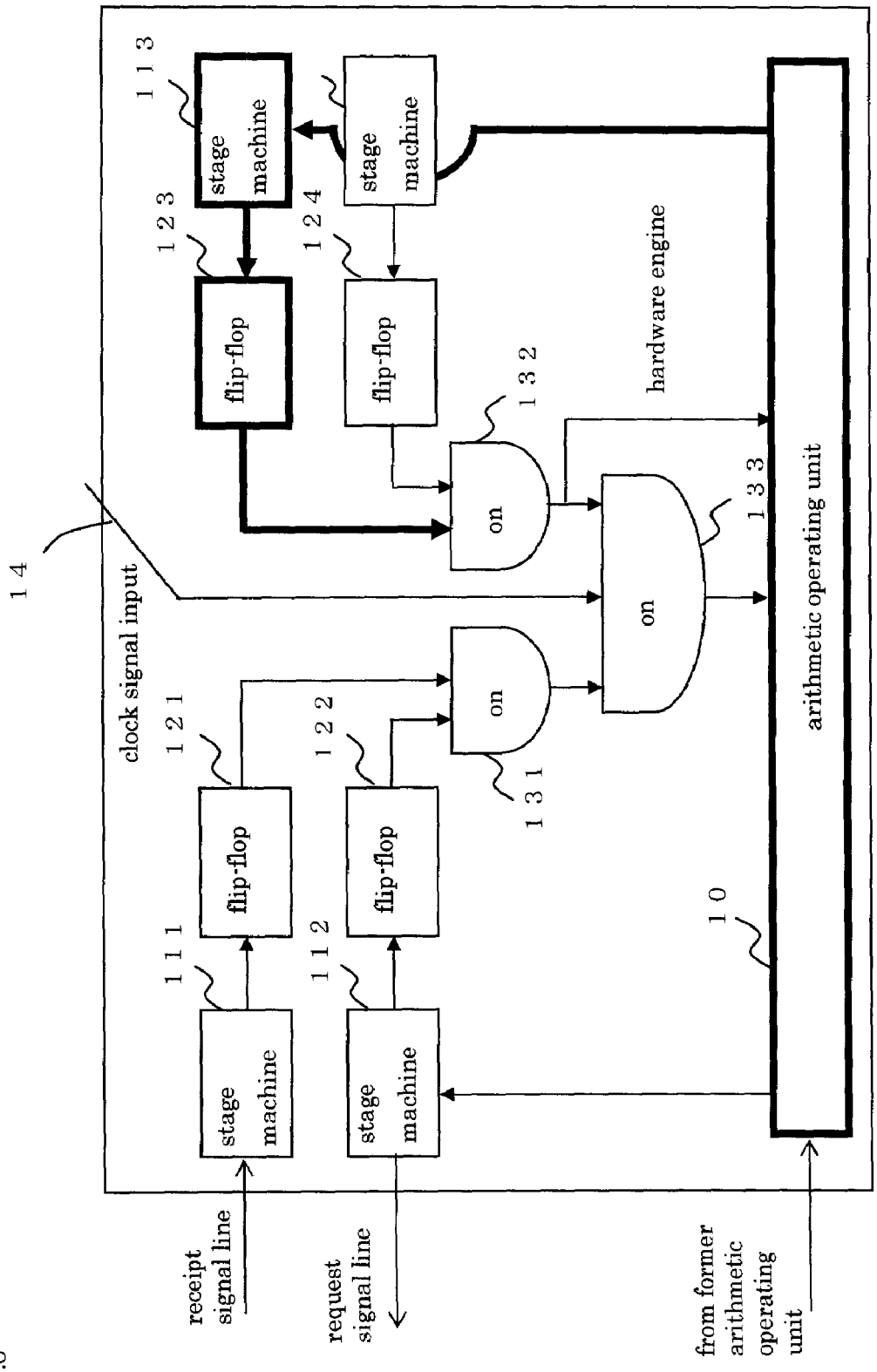
FIG. 8: Figure showing flow of process in the case of end of pipeline process of arithmetic operation unit 10 at the present stage.

FIG. 8 is a figure showing process flow in the case of end of pipeline process of arithmetic operation unit 10 of the stage. When process ends, arithmetic operation unit 10 of the stage output end signal for status machine 113. Status machine 113 is connected to receipt signal line for arithmetic operation unit 10 of the next stage and makes receipt signal level active (high). In addition, status machine 113 output signal to flip-flop 123 and reverses flip-flop 123 (ON to OFF). This status machine maintains the status transition and keeps output status.

Figure 9:
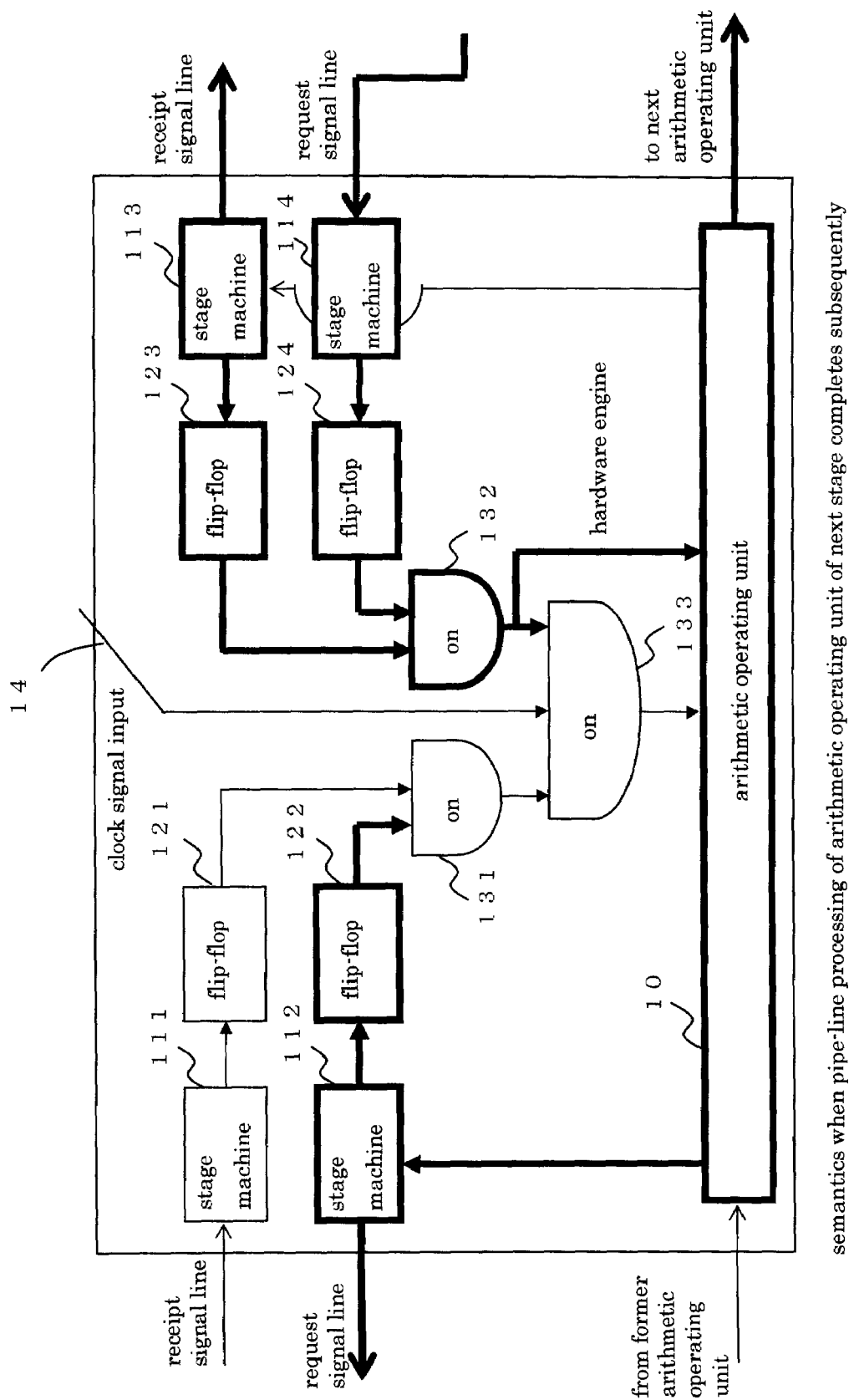
FIG. 9: Figure showing process flow in the case of detection of request signal of the next stage after end of pipeline process of arithmetic operation unit 10 of the next stage from FIG. 8 status.

FIG. 9 is a figure showing flow of process in the case that pipeline process of arithmetic operation unit 10 ends from status of FIG. 8 and that request signal of the next arithmetic operation unit 10.

Next arithmetic operation unit 10 when pipeline process ends, makes request signal line for the stage arithmetic operation unit 10 active (high) and outputs request signal for status machine 114 of arithmetic operation unit 10 of the stage. Output of request signal means that arithmetic operation unit 10 of the next stage already output processed data to arithmetic operation unit of the next of the next stage or the later. Status machine 114 of arithmetic operating unit 10 of the stage output signal for flip-flop 124 and reverse it (OFF to ON). The status machine 114 maintains the status transition and keeps output status.

In the status of this FIG. 7, AND circuit is active (high) for both inputs and it is ON.
Output of AND circuit 132 is input to arithmetic operation unit 10 of the stage. Arithmetic operation unit 10 of the stage detect that handshake is established between arithmetic operation unit 10 of the stage and arithmetic operation unit 10 of the next stage and that status becomes that output of the processed data of the present stage for the next stage. And it outputs processed data of arithmetic operation unit 10 of the present stage to the arithmetic operation unit 10 of the next stage.

As arithmetic operation unit 10 of the present stage outputs processed data to the next stage, it becomes a status that it is capable to receive processed data from the previous stage. And it outputs request signal via status machine 112 for arithmetic operation unit 10 of the previous stage via request signal line. After the FIG. 9, arithmetic operation unit 10 of the present stage whose clock signal supply is stopped and gets into clock gating status.

Figure 10:
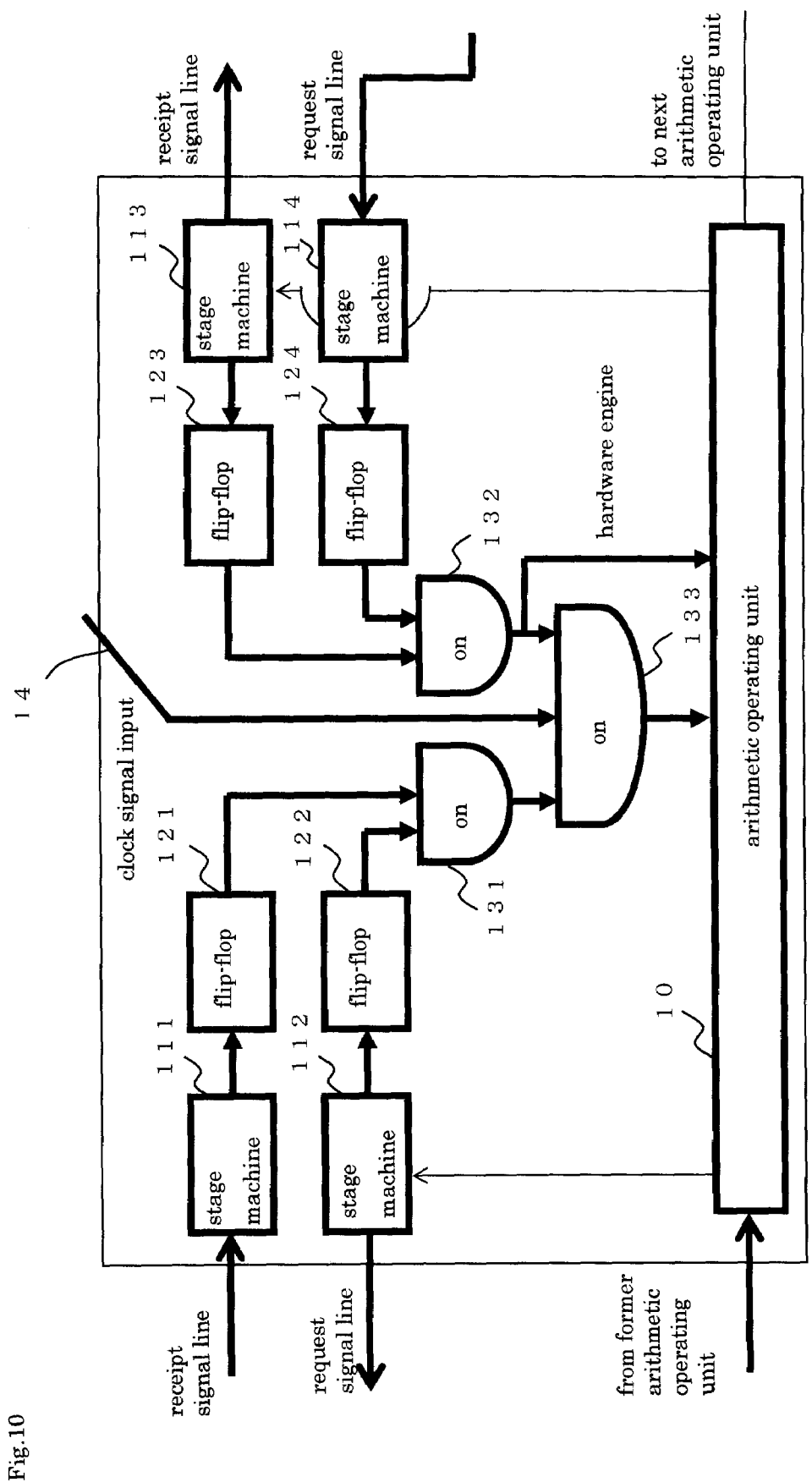
FIG. 10: Figure showing process flow in the case of end of data processing of arithmetic operation unit 10 of previous stage from status of FIG. 9.

FIG. 10 is a figure showing process flow in the case that data process of arithmetic operation unit 10 of the previous process from FIG. 9 status.

When arithmetic operation unit 10 of the previous stage arithmetic operation unit ends process, it makes receipt signal line active (high) for the stage arithmetic operation unit 10 and outputs receipt signal for status machine 111 of arithmetic operation unit 10 of the present stage. status machine 111 outputs signal for flip-flop 121 and invert flip-flop 121 (OFF to ON). The status machine 111 maintains the transition status and keeps output.

In the status of this FIG. 10, as AND circuit 131 is active (high) for both inputs, it becomes ON. Handshake is established between the previous stage arithmetic operation unit 10 and the present stage arithmetic operation unit 10. In addition, as the stage arithmetic operation unit 10 already outputs processed data to the next stage arithmetic operation unit when handshake is established between the previous stage arithmetic operation unit 10 and the present stage arithmetic operation unit 10, processed data is transferred from the previous stage arithmetic operation unit 10 to the present stage arithmetic operation unit. Moreover, in the status of FIG. 10, AND circuit 133 become ON because both inputs from AND circuit 131 and AND circuit 132 become active (high).

At this moment, AND circuit 133 acts as gate as for clock input and clock signal supply starts, as clock gate becomes active.

These are the operating example in the case that data process of arithmetic operation unit 10 of the present stage ends in first and that data process of arithmetic operation unit 10 of the next stage ends next and that process of arithmetic operation unit 10 of the previous stage ends last. Thus in the case that pipeline process end in the order of arithmetic operation unit 10 of the present stage, arithmetic operation unit 10 of the next stage, arithmetic operation unit 10 of the previous stage, after pipeline process end of arithmetic operation unit 10 of the next stage, clock gating is executed until pipeline process of arithmetic operation unit 10 of the previous stage end.

Next, the 2nd operating example is one of flow in the case that data process of arithmetic operation unit 10 of the present stage end in first, that data process of arithmetic operation unit 10 of the previous stage end next and that process of arithmetic operation unit 10 of the next stage ends. The flow is explained by dividing FIG. 11 to FIG. 13.

Figure 11:
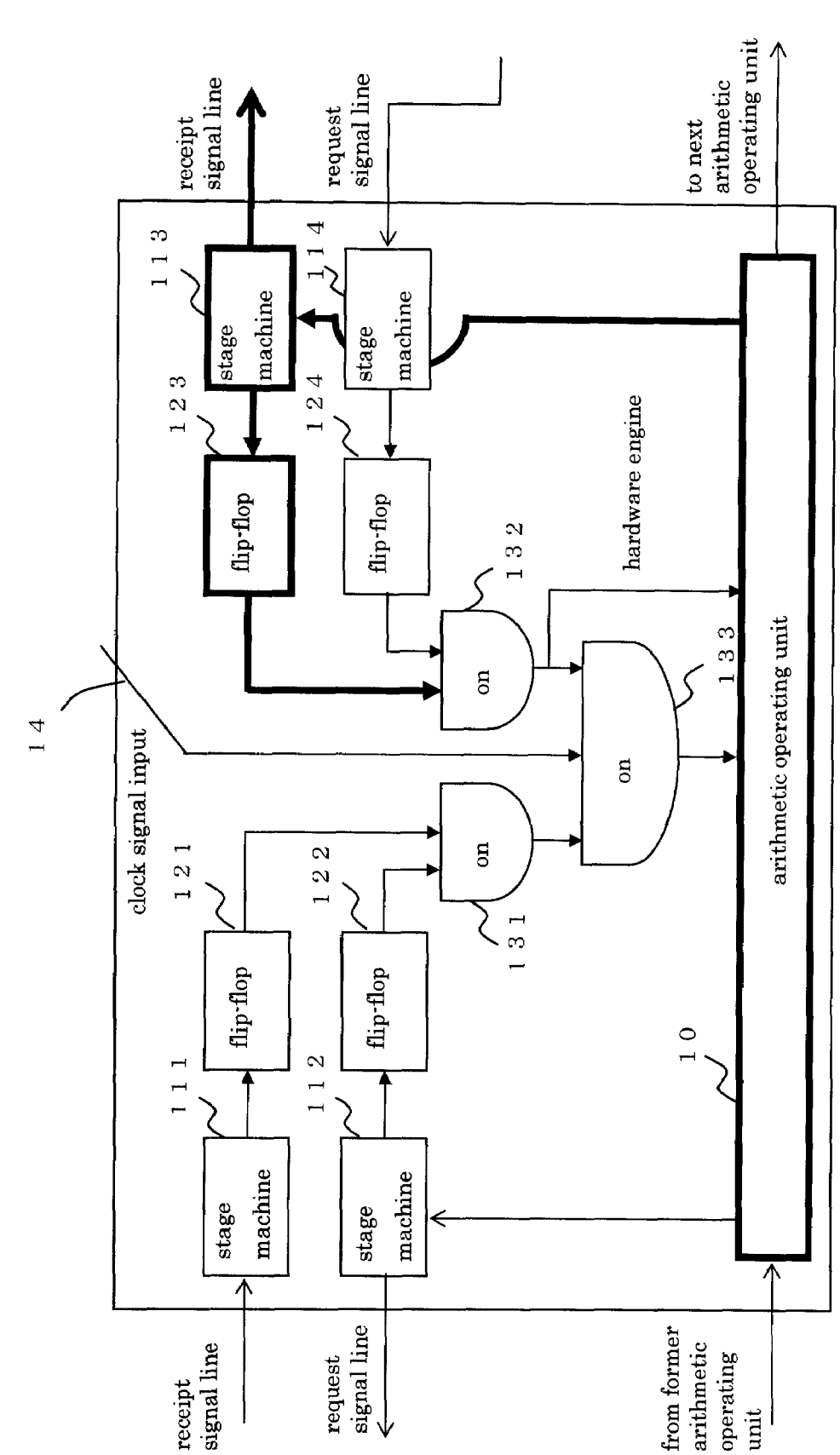
FIG. 11: Figure showing process flow in the case of pipeline process of arithmetic operation unit 10 of the present stage.

Operating shown in FIG. 11 in the case that data process of arithmetic operation unit 10 of the present stage end is the same as one shown in FIG. 8. The explanation here is omitted.

Figure 12:
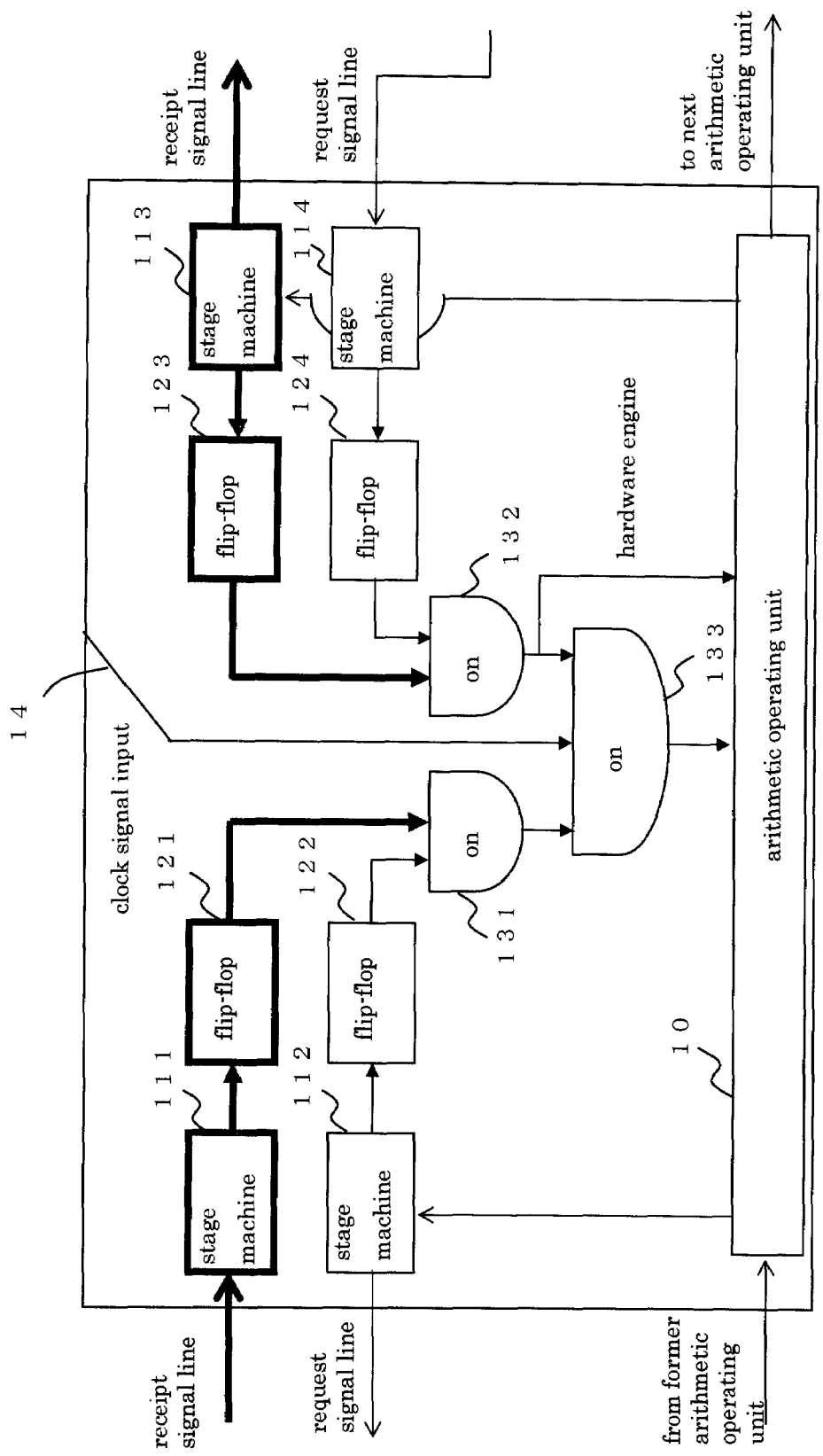
FIG. 12: Figure showing process flow in the case of end of data processing of arithmetic operation unit 10 from FIG. 11 status.

Next, FIG. 12 is a figure showing process flow in the case that data process of arithmetic operation unit 10 of the previous stage end from status of FIG. 11. When arithmetic operation unit 10 of the previous stage ends process, it makes receipt signal line active (high) for arithmetic operation unit 10 of the present stage and outputs receipt signal for status machine 111 of arithmetic operation unit 10 of the present stage. Status machine 111 outputs signal to flip-flop 121 and reverse flip-flop 121 (OFF to ON).

The status machine 111 maintains the status transition and keeps output status. In this status of FIG. 12, as only one signal is active (high) and another signal is inactive (low) about AND circuit 131 and AND circuit 132, OFF is kept. Handshake between arithmetic operation unit 10 of the previous stage and arithmetic operation unit 10 of the present stage is not established and handshake between arithmetic operation unit 10 of the next stage and arithmetic operation unit 10 of the present stage.

After this FIG. 12, arithmetic operation unit 10 of the present stage is stopped with clock signal supply and get into a status of clock gating.

Figure 13:
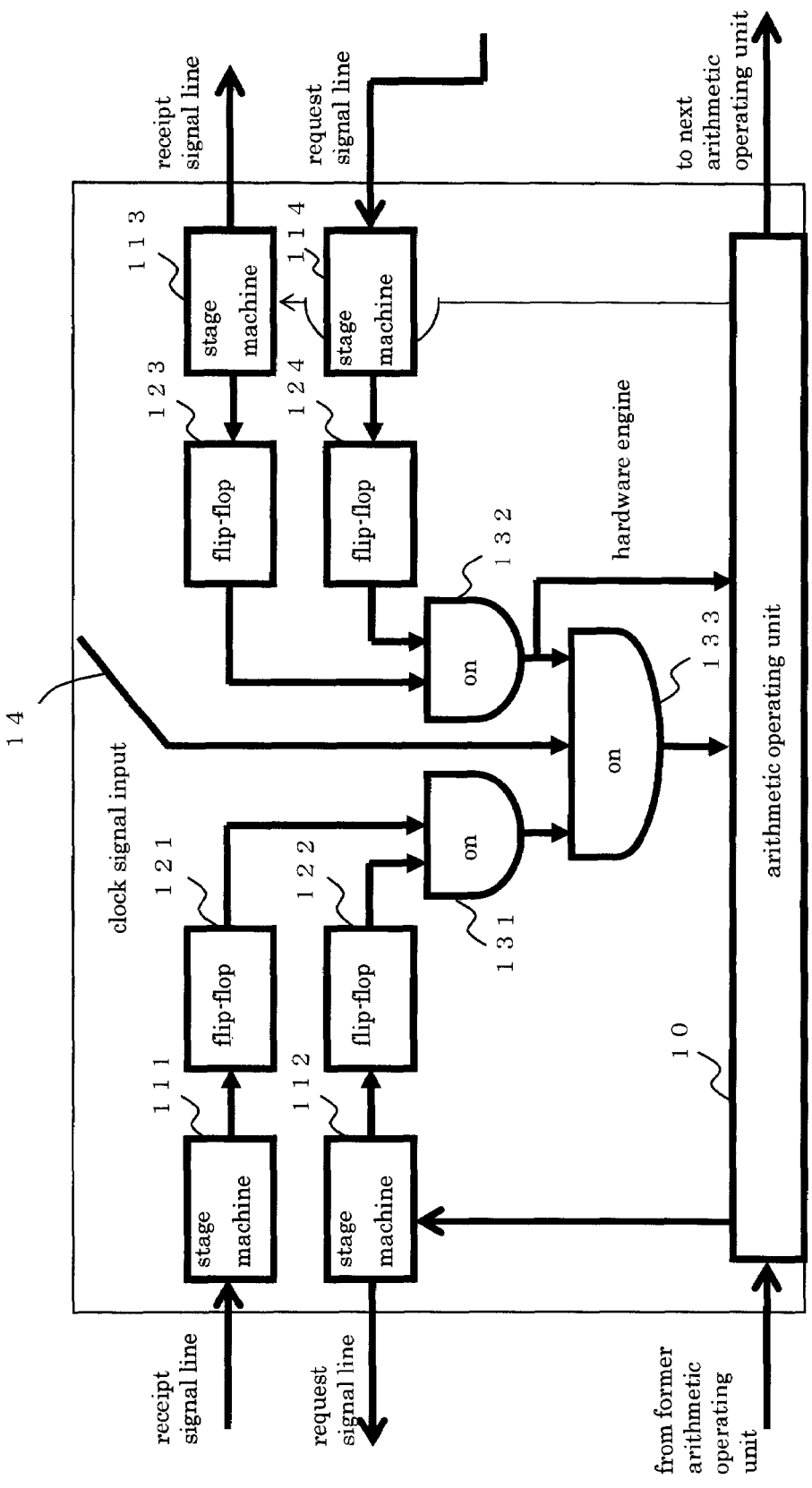
FIG. 13: Figure showing operation in the case of detecting request signal from arithmetic operation unit 10 of the next stage after pipeline operation end of arithmetic operation unit 10 of the next stage from the status of FIG. 12.

Next, FIG. 13 is a figure showing operating in the case that pipeline process of arithmetic operation unit 10 ends from the status of FIG. 12 and that request signal from arithmetic operation unit 10 of the next arithmetic operation unit is detected. Arithmetic operation unit 10 of the next stage, when its pipeline process ends, makes request signal line active (high) for arithmetic operation unit 10 of the present stage and outputs request signal for status machine 114 of arithmetic operation unit 10 of the present stage. Outputting of request signal means that arithmetic operation unit 10 of the next stage outputs processed data for arithmetic operation unit after the next of the next arithmetic operation unit. Status machine 114 of arithmetic operation unit 10 of the present stage outputs flip-flop 124 and reverses flip-flop (OFF to ON). This status machine 114 maintains this status transition and keeps output status.

In this status of FIG. 13, AND circuit 132 becomes ON as both inputs are active (high).

Output of AND circuit 132 input for arithmetic operation unit 10 of the present stage. Arithmetic operation unit 10 of the present stage outputs processed data of the present arithmetic operation unit 10 to arithmetic operation unit 10 of the next stage because handshake is established between arithmetic operation unit 10 of the present stage and arithmetic operation unit 10 of the next stage and because it detects that status becomes to be able to output processed data of arithmetic operation unit 10 of the present stage to the next stage.

As arithmetic operation unit 10 of the present stage outputs processed data to the next stage, its status is capable to receive processed data from the previous stage and via status machine 112, it outputs request signal for arithmetic operation unit 10 of the previous stage via request signal line.

Arithmetic operation unit 10 of the previous stage, receiving that request signal line from arithmetic operation unit 10 of the present stage becomes active (high), passes processed data for arithmetic operation unit 10 of the present stage.

In this status of FIG. 13, AND circuit 131 becomes ON as both inputs is active (high).
Moreover, in the status of FIG. 13, AND circuit 133 becomes ON because both inputs from AND circuit 131 and from AND circuit 132 are active (high).
Here, AND circuit 133 act as gate for clock input and clock signal supply starts as clock gate becomes active.

These ate operating example of a flow in the case that data process of arithmetic operation unit 10 of the present stage ends in first, that data process of arithmetic operation unit 10 of the previous stage and that process of arithmetic operation unit 10 of the next stage ends last. As above, in the case that pipeline process ends in order of arithmetic operation unit 10 of the present stage, arithmetic operation unit 10 of the previous stage and arithmetic operation unit 10 of the next stage, after the end of pipeline process of arithmetic operation unit 10 of the previous stage, until pipeline process of arithmetic operation unit 10 of the next stage ends, clock gating is executed.

Figure 14:
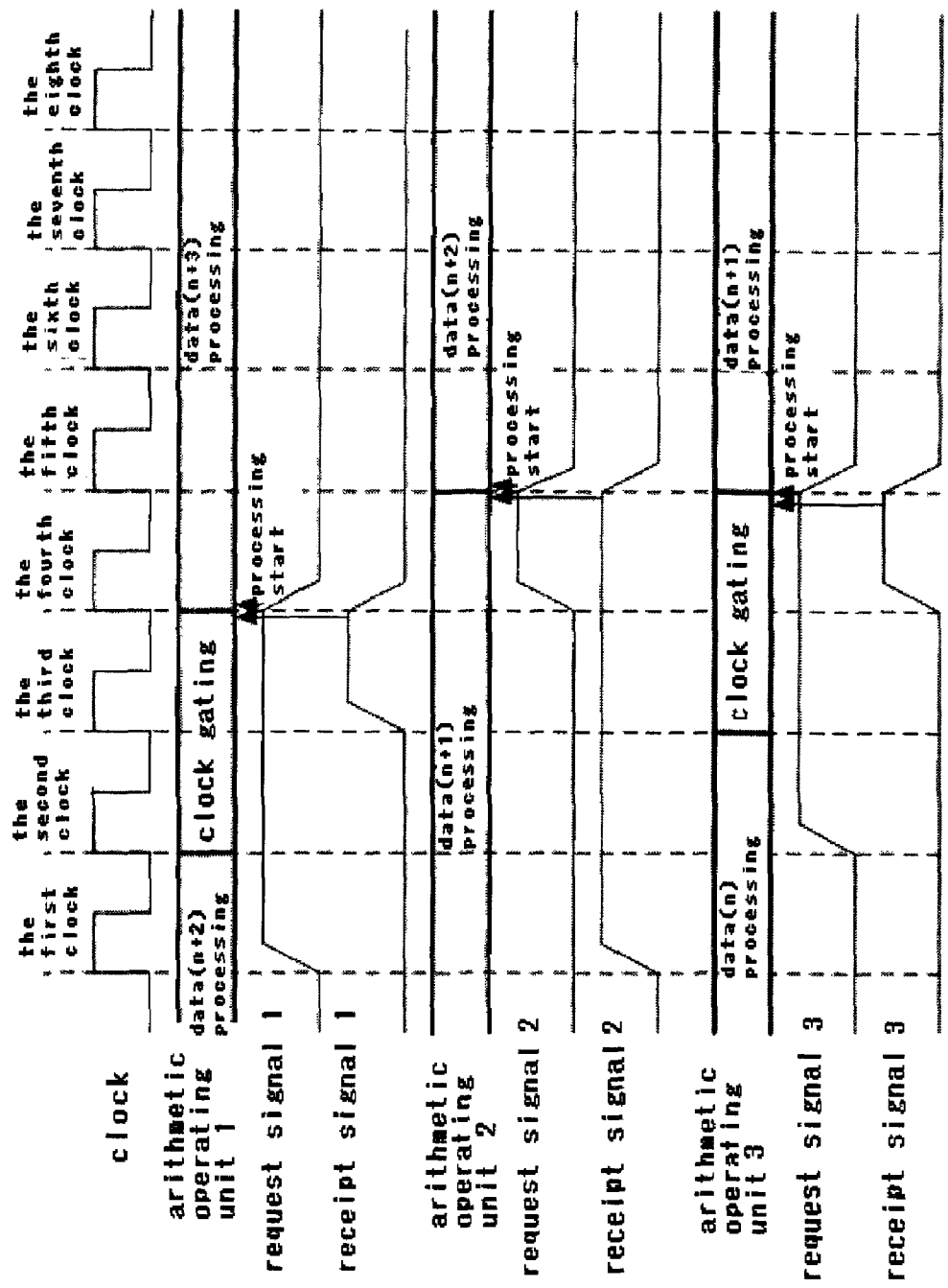
FIG. 14: Timing chart showing pipeline process by digital VLSI circuit of example 2.

FIG. 14 is a timing chart showing pipeline process by digital VLSI circuit of example 2. In this timing chart, only 3 arithmetic operation units such as arithmetic operation unit 1 (10*a*), arithmetic operation unit 2 (10*b*) and arithmetic operation unit 3 (10*c*), are shown.

In timing chart of FIG. 14, at the point of the 1st clock, data (n+2) is processed in arithmetic operation unit 1 (10*a*), data (n+1) is processed in arithmetic operation unit 2 (10*b*) and data (n) is processed in arithmetic operation unit 3 (10*c*).

Arithmetic operation unit 1 (10*a*) completes pipeline process of data (n+2) at the 1st clock in the figure and it outputs request signal.

Arithmetic operation unit 2 (10*b*) completed pipeline process of data (n+1) at the 4th clock and output receipt signal from arithmetic operation unit 3 (10*c*).

Arithmetic operation unit 3 (10*c*) completes pipeline process of data (n) at the 2nd clock of the figure and outputs request signal. In addition, it receives receipt signal at the 4th clock from the next arithmetic operation unit.

In timing chart of FIG. 14, clock gating is executed in arithmetic operation unit 1 (10*a*) from the 2nd clock to the 3rd clock by the 2nd operating example above (operating example as shown in from FIG. 11 to FIG. 13). About arithmetic operation unit 2 (10*b*), as arithmetic operation unit 1 (10*a*) and arithmetic operation unit 3 (10*c*) completed their processes before completion of process by arithmetic operation unit 2 (10*b*), there is no period of clock gating and process of (n+2) th data start at the next clock of completion of (n+1) th data process. In arithmetic operation unit 3 (10*a*), by the 1st operating example (operating example shown in from FIG. 11 to FIG. 13) clock gating is executed from the 3rd clock to the 4th clock.

Figure 15:
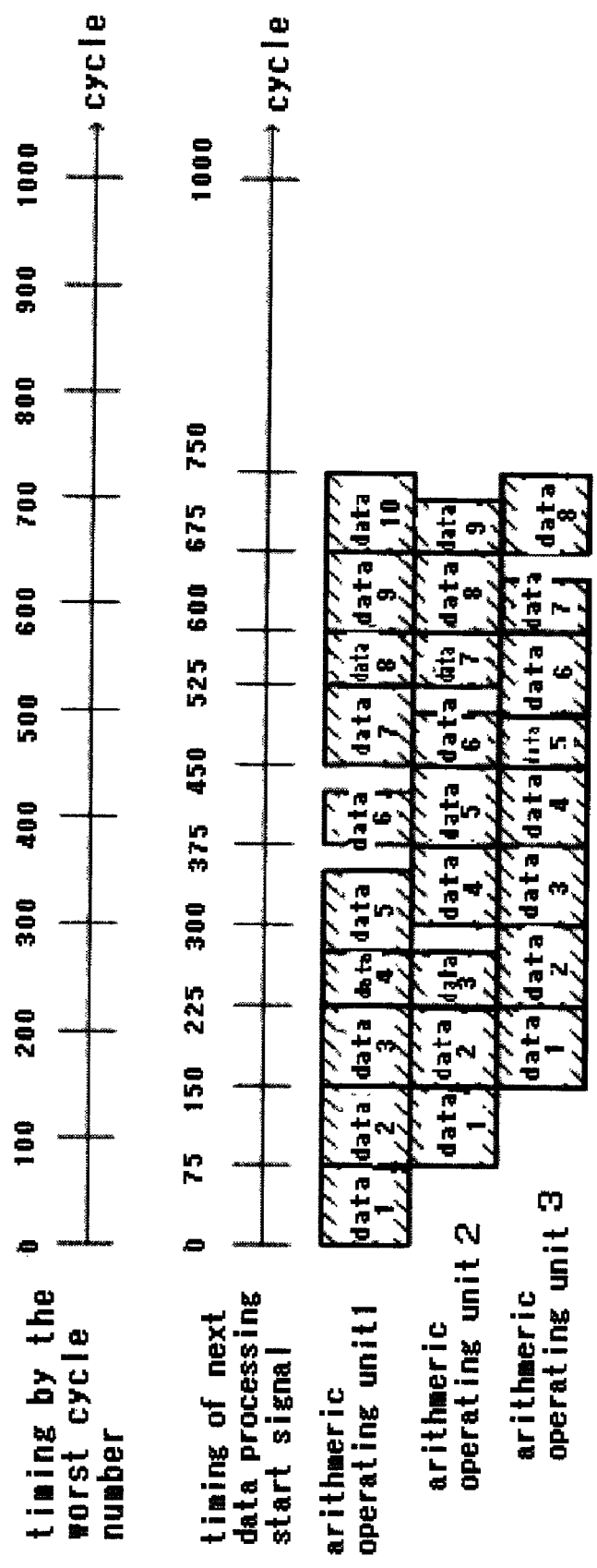
FIG. 15: Diagram showing proceedings of pipeline operating in digital VLSI circuit of example 2.

FIG. 15 is a diagram showing operating proceedings of pipeline in digital VLSI circuit of example 2. Explanation of elements in each figure shown in FIG. 15 is omitted, as they are the same as the explanation of the element of each figure. As shown in timing chart of FIG. 15, among arithmetic operation unit 10*s*, what end pipeline process in charge early, until pipeline process end in the previous or next arithmetic operation unit 10*s*, clock gating is executed.

For example, within 500 cycles to 525 cycle of arithmetic operation unit 2 (10*b*) or within 625 cycles to 650 cycles, there is a period of clock gating execution. In this example, it is a clock gating after process completion of arithmetic operation unit of the previous stage, in the case of operating example 1 above in which clock gating of the present stage is released.

For example, there are periods executing clock gating between 350 cycles and 375 cycles, between 425 cycles and 450 cycles of arithmetic operation unit 1 (10*a*) and between 275 cycles to 300 cycle of arithmetic operation unit 2 (10*b*). In this example, it is a clock gating in the case of operating example 2 above, releasing clock gating of arithmetic operation unit of the present stage after completion of process of arithmetic operation unit of the next stage.

In example 1, in the same pipeline stage, clock-gating period is established till process of all arithmetic operation units end. In example 2, as above, as clock gating period is established till process of previous and next arithmetic operation unit of the present arithmetic operation unit end at the same pipeline stage, pipeline process of the last macroblock ends earlier and it is understood that number of time of clock gating start and that of clock gating stop are capable to be decreased.

In addition, digital VLSI circuit of above example 2 is a constitution example in which pipeline arithmetic processing is executed by macroblock unit (macroblock data is comprised of a plurality of block data. In addition, it is comprised of 24.) But it is possible to be executed by block unit.
In the case of executing pipeline process by block unit, constitution is as follows: arithmetic operation unit executes pipeline arithmetic processing by block data unit, clock signal supply control means, in arithmetic processing of last block data in last macroblock data of frame data, after clock signal supply for the next arithmetic operation unit is stopped, stop of clock signal supply for arithmetic operation unit of the next stage is continued even if end of arithmetic processing of the previous arithmetic operation unit is detected, after passing of frame process period, clock signal supply for all arithmetic operation unit for pipeline arithmetic processing of the next frame data restarts.

In addition, control means for clock signal supply, in arithmetic processing of last block data of last macroblock data of frame data, after stopping of clock signal supply for arithmetic operation unit of the previous stage, even if arithmetic operation unit of the previous stage can output arithmetic processed data for arithmetic operation unit of the next stage, stopping of clock signal supply for arithmetic operation unit of the previous stage, after frame process period passes, clock signal supply for all arithmetic operation unit restarts for pipeline arithmetic processing of the next frame data. These are constitution.

EXAMPLE 3

Digital VLSI circuit of example 3 executes dynamic regulation by feedback or feed forward control on operating power source voltage, board bias voltage and operating frequency of arithmetic operation unit.

In digital VLSI circuit comprised of pipeline of the present invention shown in example 1 and example 2, compared to digital VLSI circuit comprised of conventional pipeline, cycle number necessary for decoding process fluctuates largely by frame unit according to large or small number of effective block included in decoding process object bitstream or to large or small number of effective factor.

In addition, in decoding process, according to large or small number of block matching number executed in operating compensation process, generated effective block number or effective factor, cycle number necessary for decoding process fluctuates largely by frame unit. Therefore, digital VLSI circuit comprising dedicated hardware of the present invention shown in example 1 and example 2 can cut power consumption down adapting dynamic regulation of feedback regulation and feed forward regulation by suppressing operating power voltage and board bias voltage appropriate value. In addition, suppression of operating frequency of arithmetic operation unit to appropriate value is effective for reducing power consumption.

Figure 16:
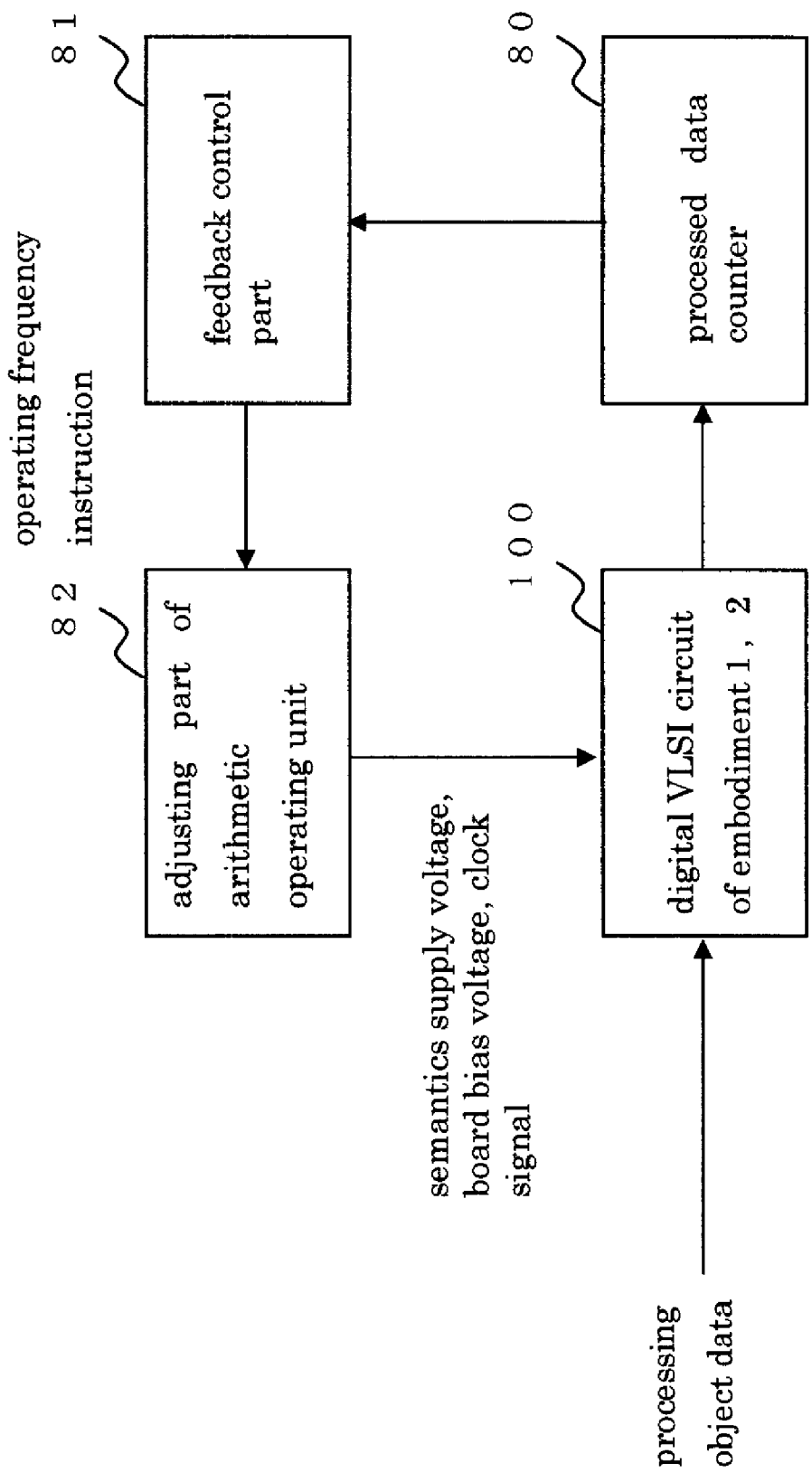
FIG. 16: Block diagram to which dynamic regulation of feedback type is applied for digital VLSI circuit of dedicated hardware constitution.

FIG. 16 is a block diagram applied with dynamic regulation of feedback type for digital VLSI circuit of dedicated hardware constitution.

Processed macroblock counter 80 is a part that counts data process quantity of pipeline arithmetic processing by frame data. Feedback control part 81 is a part which calculates operating frequency of arithmetic operation unit from number of unprocessed macroblock included in processing frame at the time according to count number of processed macroblock which is counted by processed macroblock counter 80 and from time to complete frame process of processing at the time.

Arithmetic operation unit control part 82 is a part adjusting operating power voltage of arithmetic operation unit, board bias voltage and operating frequency based on operating frequency determined by feedback control part 80.

As shown in FIG. 16, for digital VLSI circuit shown in example 1 or example 2, by forming feedback loop by processed macroblock counter 80, feedback control part 81 and arithmetic operating unit control part 82, dynamic control by feedback control can be executed on operating power voltage, board bias voltage and operating frequency in a digital VLSI circuit 100.

In feedback loop, by cooperation among processed macroblock counter 80, feedback control part 81 and arithmetic operation unit control part 82, there are various methods for feedback control. By count of processed macroblock counter 80 number of processed macroblock is calculated by time course.

For example, pipeline is constituted with macroblock pipeline explained in example 1 and example 2, if there is macroblock with short process time as explained in example 1 and example 2, cycle allowance of macroblock pipeline process is born.

Arithmetic operating unit control part 81 controls to reduce operating power voltage, board voltage and operating frequency using float time of the cycle. For example, if worst cycle number of macroblock of each stage of pipeline set n and if cycle number necessary for pipeline process is m cycle at every stage, allowance of (n−m) cycle is generated. Consequently, in the next pipeline process, there is n+(n−m) =2n−m cycle process time. As cycle necessary for pipeline process is n cycles at most even if worst cycle number, next pipeline process can retain worst cycle number within restricted time even if operating frequency decreases. Consequently, feedback control part 81, for arithmetic operating unit control part 82, can adjust operating power voltage, board voltage and operating frequency to n/(2n−m).

Figure 17:
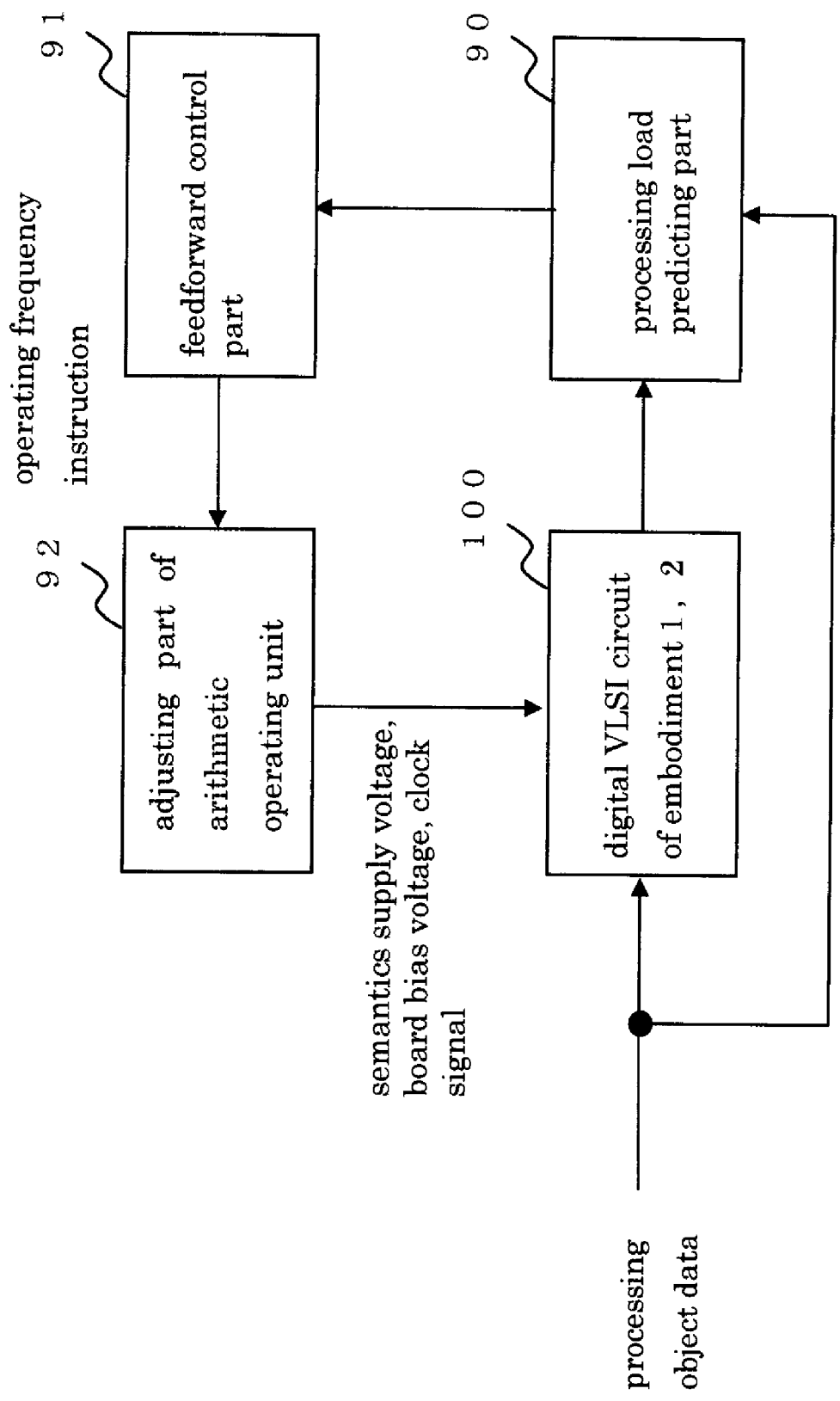
FIG. 17: Block diagram to which dynamic regulation of feedforward type is applied for digital VLSI circuit of dedicated hardware constitution.

FIG. 17 is a block diagram applied with dynamic regulation of feedforward for digital VLSI circuit of dedicated hardware constitution.

Process load prediction part 90 is a part which before pipeline arithmetic processing, detects macroblock data quantity included in frame data supplied for pipeline arithmetic processing and which predicts process load of pipeline arithmetic processing. Feedforward control part 91 is a part that determines operating power voltage, board bias voltage and operating frequency, based on prediction by process load prediction part 90.

Arithmetic operating unit control part 92 is a part, which controls operating power voltage, board bias voltage and operating frequency based on the determination of feedforward control part 91.

As shown in FIG. 17, for digital VLSI circuit 100 shown in example 1 or example 2, by forming feedforward loop with process load prediction part 90, feedforward control part 91 and arithmetic operating unit control part 92, dynamic control by feedforward control can be executed on operating power voltage, board bias voltage and operating frequency of arithmetic operation unit in digital VLSI circuit.

Feedforward regulation methods have various ones by cooperation among process load prediction part 90, feedforward control part 91 and arithmetic operation unit control part 92. Process load prediction part memorize process cycle number necessary for data process to be processed within restricted time in the past. For example, in moving picture process by MPEGx, H.26x, restricted time is 1 frame time and data to be processed within restricted time is all macroblock included in 1 frame.

In dynamic picture image process by MPEGx or H.26x, as there are I frame, P frame and B frame type as frame type, process load prediction part 90 memorize process cycle number by each frame type. Process load prediction part 90 check frame type of frame supplied for process after this, predicts past processed cycle number according to frame type as process cycle number and outputs signal representing predicted cycle number for feedforward part 91.

Feedforward part 91, based on prediction of process load prediction part 90, for arithmetic operating unit control part 92, controls to decrease operating power voltage, board bias voltage and operating frequency. If worst cycle number is n and if prediction cycle number is m, it can control to decrease to m/n.

In addition, expectation falls short by reducing m/n as penalty that process does not complete within restricted time in the case that real process cycle number is larger than m, scheme that estimates larger than n is possible for reduction of the risk. For example, when predicted cycle number of process load prediction part 90 is m, feedforward part 91 adjusts (1.1) m or after adjusting (1.2) m, arithmetic operating unit control part 92 is forced to adjust (1.1) m/n or (1.2) m/n.

In addition, there are several methods for prediction method of prediction cycle number based on past process cycle number. At 1st, method is to use past one of the nearest time among macroblocks of the same type. In dynamic picture, as time is nearer, process cycle number among macroblocks is expected to become more similar. At the 2nd, a method is to use mean value of process cycle number of several macroblocks near in time within macroblock of the same time.

EXAMPLE 4

Example 4 is a constitute wherein clock signal supply control means of digital VLSI circuit shown in example 1, example 2 and example 3 are replaced by power supply control means. Power saving is possible by reducing start number of clock gating and stop number of that but the same effect can be obtained by reducing start number of power supply and stop number of that by constitution controlling ON/OFF of not clock gating but power supply itself.

For example, it is only necessary to replace part on clock signal supply by power supply in explanation in example 1, 2 and 3, clock gating period by power stopping period in explanation of timing chart, figures by corresponding figures (for example, it is only necessary to replace clock input 14 by power supply line 14).

EXAMPLE 5

Example 5 is an applied example wherein digital VLSI circuit of the present invention shown in above examples 1, 2, 3 and 4 is integrated.

Figure 18:
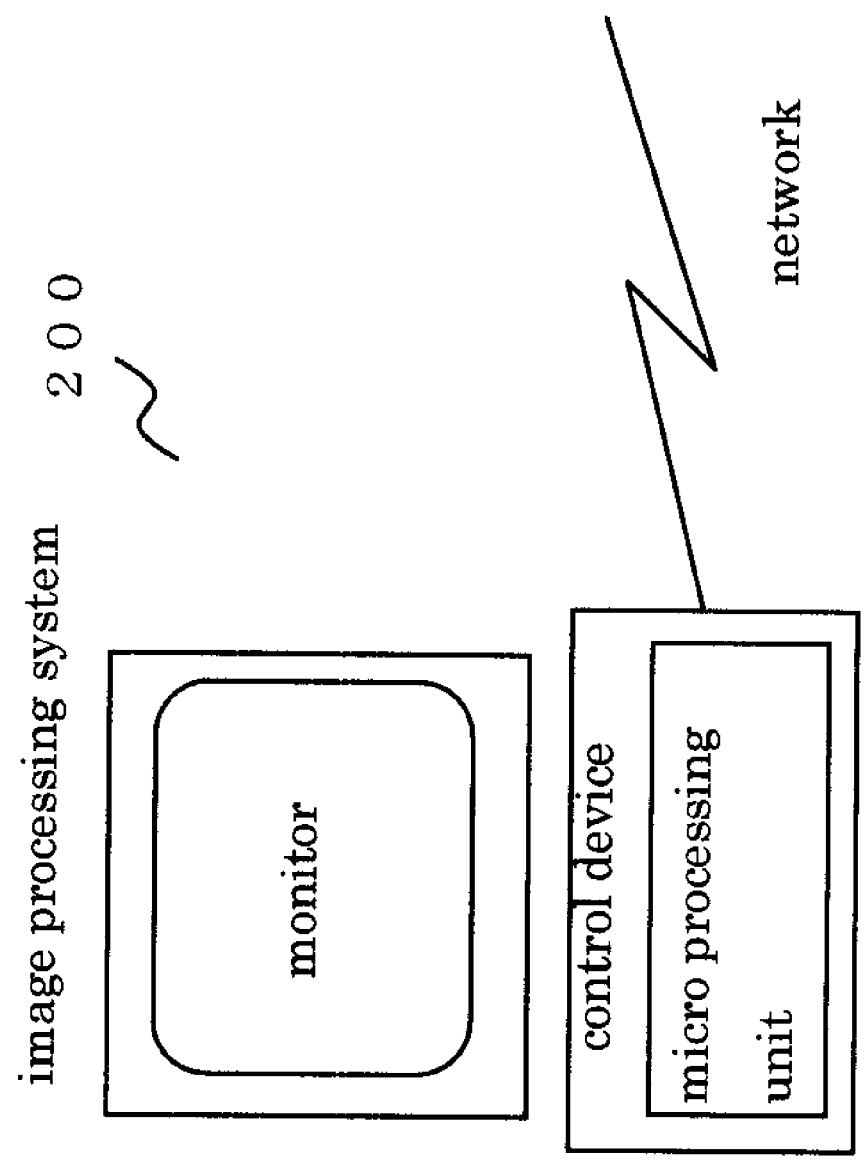
FIG. 18: Figure showing constitution example of moving picture integrated with digital VLSI circuit of the present invention.

FIG. 18 is a figure showing constitution example of image process system integrated with digital VLSI circuit of the present invention. For example, it may be constituted as personal computer whose microprocessor uses digital VLSI circuit of the present invention and digital VLSI circuit of the present invention may be integrated into image process board as image process tip.

Figure 19:
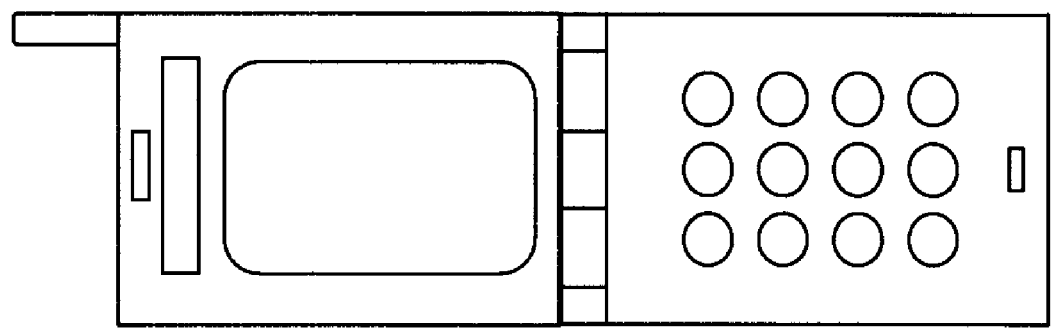
FIG. 19: Figure showing constitution example of mobile terminal integrated with digital VLSI circuit of the present invention.
Figure 20:
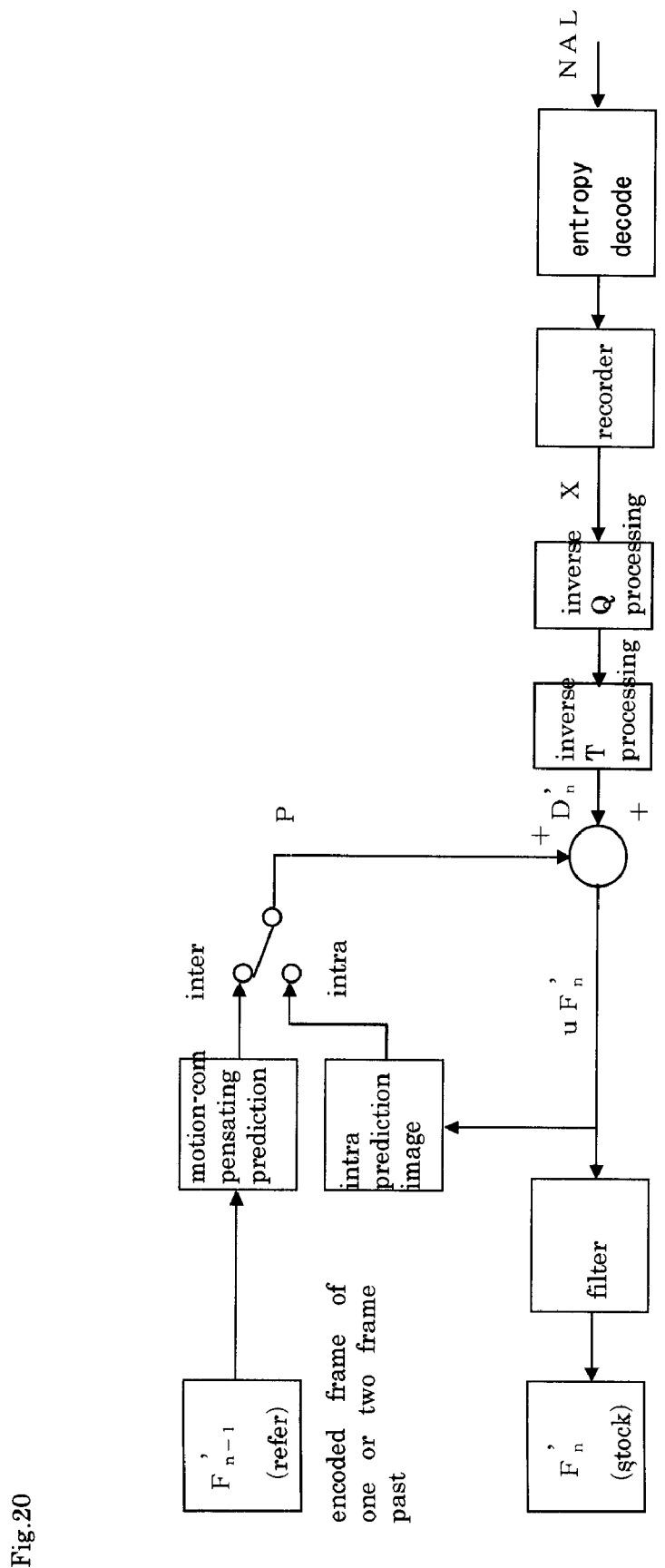
FIG. 20: Block diagram of H.264 decoded process module.
Figure 21:
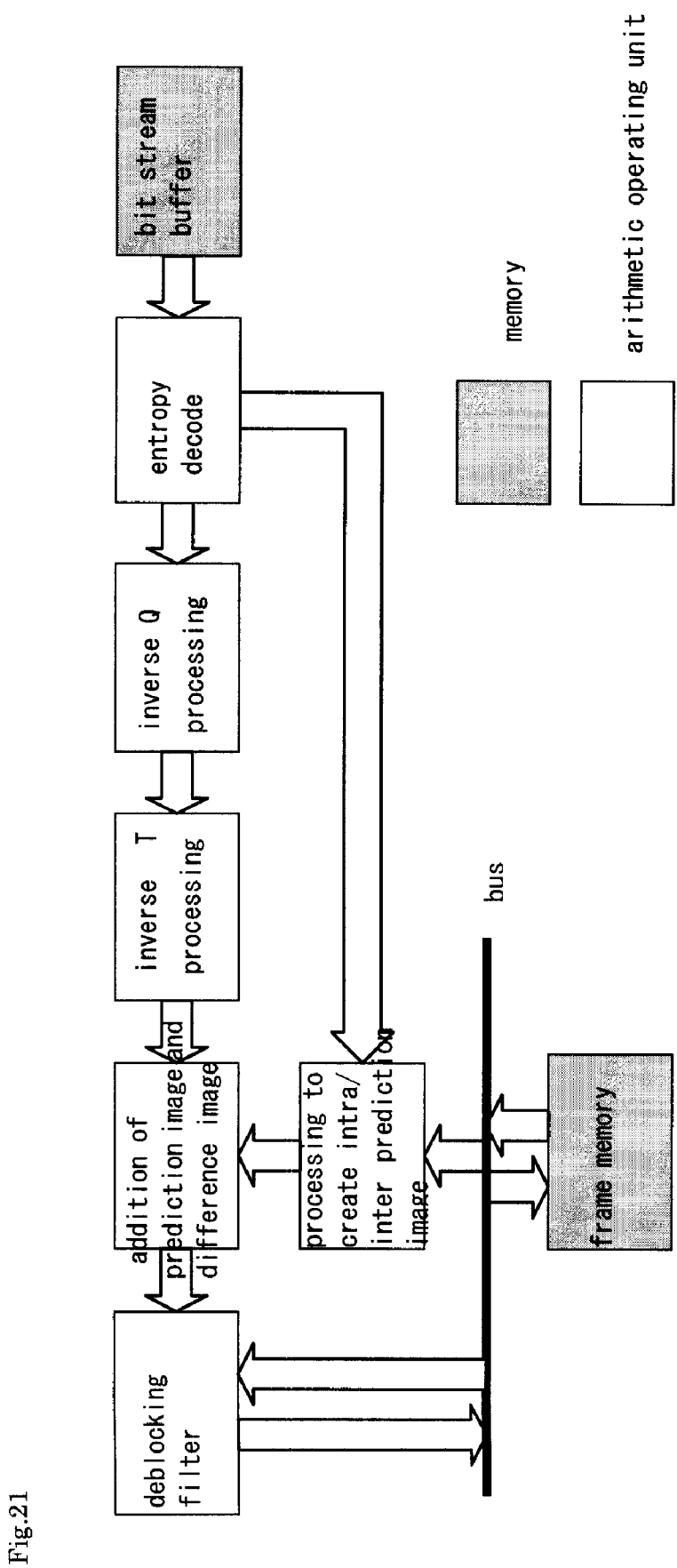
FIG. 21: Figure showing example constituted H.264 decoded process module by dedicated hardware using a plurality of arithmetic operation units based on block diagram shown in FIG. 20.
Figure 22:
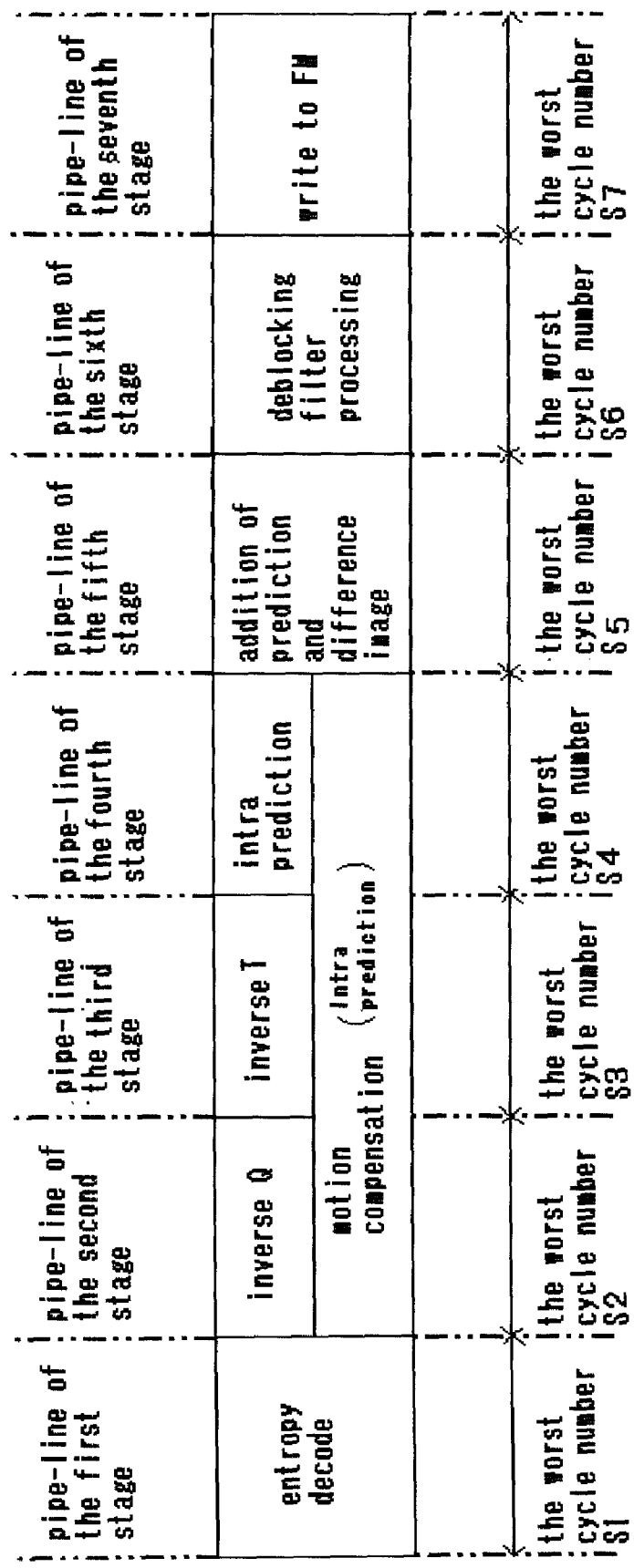
FIG. 22: Figure showing pipeline division.

FIG. 19 is a figure showing constitution example of mobile terminal 300 integrated with digital VLSI circuit of the present invention. In this constitution is an example integrated into mobile phone. While cellar phone with ability of moving picture process is being put in, request for reducing power is very strong. So, mobile phone incorporated with digital VLSI circuit of the present invention can reduce power consumption and can increase process speed of processing dynamic picture image.

As above, according to digital VLSI circuit of the present invention, period that enters idling state after ending process of all arithmetic operation units can be omitted. Moreover, further decrease of power consumption can be tried by reducing start number, end number of clock gating or power supply by closely executing arithmetic processing of pipeline in arithmetic operation unit. In addition, according to digital VLSI circuit of the present invention, when process of arithmetic operation unit of previous and after pipeline process end, data process cycle number (in the case of dynamic picture image processing cycle number of macroblock process or block process) can be decreased by reciprocating processed data among arithmetic operation units. Moreover, by closely executing pipeline arithmetic processing at arithmetic operation units, start number and stop number of clock gating or power supply can be reduced and further reducing power consumption can be tried. Moreover, according to process for real data, cycle number necessary within restricted time can be greatly reduced and by dynamic regulation of operating frequency/voltage using float time generated by reducing cycles, further reducing of power consumption can be tried.

[Industrial Applicability]

According to image process system of the present invention, in data process of dynamic picture image reducing power consumption is tried, integration for various system required for low power consumption becomes easy and flexible system design become possible.

According to mobile terminal of the present invention, in data process of dynamic picture image reducing power consumption is tried, in small terminal such as mobile phone, encoding and decoding process of moving pictures is possible and use of mobile terminal spread variously.

[Description of Symbols]

10 arithmetic operation unit; 11, 111, 112, 113, 114 status machine; 12, 121, 122, 123, 124 flip-flop; 13, 131, 132, 133 AND circuit; 14 clock input line; 20 process end detector; 30 end flag line; 40 process start flag line; 50 receipt signal line; 60 request signal line; 70 data line; 80 processed macroblock counter; 81 feedback control part; 82 arithmetic operation unit control part; 90 process load prediction part; 91 feedforward control part; 92 arithmetic operation unit control part; 100 digital VLSI circuit; 200 image process system; 300 mobile terminal

What is claimed is:

1. Digital VLSI circuit characterized by comprising:
    a plurality of arithmetic operation units executing arithmetic processing synchronized with clock working on each stage of pipeline arithmetic processing;
    Detection means detecting end of arithmetic processing of stage in charge in the arithmetic operation unit; and
    clock signal supply control means controlling supply/stop of clock by each arithmetic operation unit;
    wherein data of the arithmetic processing includes dynamic picture image data comprising frame data with a frame-processing period and the frame data includes a plurality of macroblock data,
    wherein the arithmetic processing includes encoding/decoding process of the dynamic picture images,
    wherein the arithmetic operation unit executes the pipeline arithmetic processing as a unit by the macroblock data,
    wherein the clock signal supply control means stop clock signal supply for the arithmetic operation unit in which end of arithmetic processing of the macroblock data is detected by the detection means;
    and wherein clock signal supply restarts for all the arithmetic operation units for the next pipeline arithmetic processing when end of arithmetic processing of the macroblock data is detected in all the arithmetic operation units by the detection means;
    wherein the clock signal supply control means in arithmetic processing of the last macroblock data in the frame data, continues stop of clock signal supply for all the arithmetic operation units even if end of arithmetic processing is detected in all the arithmetic operation unit by the detection means; and wherein clock signal supply restarts for all the arithmetic operation units for pipeline arithmetic processing of the next frame data after the frame-processing period.

2. Digital VLSI circuit of claim 1,
wherein the macroblock data comprises of a plurality of block data,
wherein the arithmetic operation unit executes the pipeline arithmetic processing as a unit by the block data,
wherein the clock signal supply means continued stop of clock signal supply for all the arithmetic operation units even if end of arithmetic processing is detected in all the arithmetic operation unit by the detection means in arithmetic processing of the last block data in the last macroblock data in the frame data; and
wherein clock signal supply for all the arithmetic operation units restarts for pipeline arithmetic processing of the next frame data after the frame processing period.

3. Digital VLSI circuit of claim 1, further comprising:
cycle number memorizing means which memorize data quantity to process arithmetically within restricted time in the past and cycle number required for arithmetic processing;
cycle number prediction means which predict cycle number necessary for arithmetic processing of data to process arithmetically till the next restricted time from data quantity to process arithmetically within the next restricted time and cycle number memorized in the memorizing means; and
control means which determine operating frequency, operating power voltage and board bias voltage of the dedicated digital VLSI circuit from cycle number calculated with the cycle prediction means and which supply clock of determined operating frequency, operating power voltage and board bias voltage corresponding to this clock;
wherein the cycle number memorizing means memorizes data quantity to process arithmetically within restricted time and cycle number required for completion of arithmetic processing for the data, just after the start of the next restricted time,
the control means of operating frequency/voltage determines operating frequency, operating power supply and board bias voltage of dedicated digital VLSI circuit from cycle number required for arithmetic processing of passed data memorized by cycle number memorizing means and data quantity to complete arithmetic processing till the next restricted time; and it controls operating frequency, operating power voltage and board bias voltage to determined value.

4. Digital VLSI circuit of claim 1, further comprising:
control means of operating frequency/voltage which from data quantity to process arithmetically within the next restricted time and data quantity of completion of arithmetic processing by at least one pipeline operation, determines operating frequency, operating power voltage and board bias voltage; and which supply clock of determined operating frequency and operating power voltage and board bias voltage corresponding to the operation frequency;
wherein the operating frequency/voltage control means determines operating frequency for arithmetic processing of the data to make it in time to complete even if cycle necessary for arithmetic processing of data to execute arithmetic processing is predicted worst cycle number in arithmetic processing of the next pipeline and controls clock operating power voltage and board bias voltage of dedicated digital VLSI circuit in arithmetic processing of the next pipeline, to the determined operating frequency, operating power voltage and board bias voltage corresponding to this operating frequency.

5. Digital VLSI circuit characterized by comprising:
a plurality of arithmetic operation unit executing arithmetic processing working of each stage of pipeline arithmetic processing;
detection means detecting end of arithmetic processing of stage in charge in the arithmetic operation unit; and
power supply control means controlling power supply/stop by the arithmetic operation unit;
wherein power supply stops for the arithmetic operation units detected end of arithmetic processing by the detection means;
wherein data of the arithmetic processing includes dynamic picture image data comprising frame data with a frame-processing period and the frame data includes a plurality of macroblock data;
wherein the arithmetic processing includes encoding/decoding of the dynamic picture image and the arithmetic operation unit executes the pipeline arithmetic processing as a unit by the macroblock data;
wherein power supply will be restarted for all the arithmetic operation units for the next pipeline arithmetic processing when end of arithmetic processing of the macroblock data in all the arithmetic operation unit by the detection means; and
wherein the power supply control part continue to stop power supply for the arithmetic operation units, in arithmetic processing of the last macroblock data in the frame data, even if arithmetic processing end is detected in all the arithmetic operation units by the detection means, and after the frame process period, power supply for all the arithmetic operation units restarts for pipeline process of the next frame data.

6. Digital VLSI circuit of claim 5;
wherein the macroblock data comprises a plurality of block data; wherein the arithmetic operation unit executes the pipeline arithmetic processing as a unit by the block data; wherein the power supply control part continues stop of power supply for all the arithmetic operation units in arithmetic processing of the last block data in the last macroblock data in the frame data, even if end of arithmetic processing in all the arithmetic operation units by the detection means; and
wherein after the frame process period passes, power supply restarts for all the arithmetic operation units for pipeline arithmetic processing of the next frame data.

7. Digital VLSI circuit described in claim 5, further comprising:
cycle number memorizing means to memorize data quantity for arithmetic operation and cycle number required for arithmetic operation within restricted time in the past;
Cycle number prediction means to predict cycle number necessary for arithmetic processing of data to be processed till next restricted time from data quantity to process within the next restricted time and cycle number memorized in the memorizing means; and
control means of operating frequency and power control means which determines operating frequency, operating power voltage and board bias voltage from cycle number calculated by the cycle number prediction means and supply clock of operating frequency, operating power voltage and board bias voltage corresponding this clock;

wherein the cycle number memorizing means memorizes data quantity to be processed within restricted time and cycle number required for completion of arithmetic processing for the data and just after start of the next restricted time the operating frequency/voltage control means determine operating frequency, operating power voltage and board bias voltage of dedicated digital VLSI circuit till the next restricted time from cycle number required for arithmetic processing of the past data memorized in cycle number memorizing means and data quantity to complete arithmetic processing till the next restricted time; and wherein the operating frequency/voltage control means control operating frequency, operating power voltage and board bias voltage to the determined value.

8. Digital VLSI circuit described in claim 5, further comprising:

operating frequency/voltage control means which determine operating frequency, operating power voltage and board bias voltage of dedicated digital VLSI circuit at the time of next pipeline operation from data quantity to be processed within the restricted time and data quantity completing arithmetic processing by at least one pipeline operation and supply clock signal of determined operating frequency, operating power voltage and board bias voltage corresponding the clock;

Wherein the operating frequency/voltage control means determine operating frequency to make it in time for time to complete arithmetic processing of the data even if necessary cycle for arithmetic processing of data to execute arithmetic processing in the next pipeline arithmetic processing is the worst cycle number, and it control clock, operating power voltage and board bias voltage of dedicated digital VLSI circuit in the next pipeline arithmetic processing to operating power voltage, board bias voltage corresponding to this operating frequency.

* * * * *